United States Patent
Huang et al.

(10) Patent No.: US 12,457,069 B2
(45) Date of Patent: Oct. 28, 2025

(54) COMMUNICATION APPARATUS AND COMMUNICATION METHOD FOR TRANSMISSION OVER COMBINATIONS OF MULTIPLE RESOURCE UNITS

(71) Applicant: Panasonic Intellectual Property Corporation of America, Torrance, CA (US)

(72) Inventors: Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 446 days.

(21) Appl. No.: 17/910,731

(22) PCT Filed: Feb. 2, 2021

(86) PCT No.: PCT/SG2021/050052
§ 371 (c)(1),
(2) Date: Sep. 9, 2022

(87) PCT Pub. No.: WO2021/183046
PCT Pub. Date: Sep. 16, 2021

(65) Prior Publication Data
US 2023/0198696 A1    Jun. 22, 2023

(30) Foreign Application Priority Data
Mar. 13, 2020 (SG) .......................... 10202002359R
Apr. 17, 2020 (SG) .......................... 10202003545Y

(51) Int. Cl.
*H04L 5/00* (2006.01)
*H04L 1/00* (2006.01)

(52) U.S. Cl.
CPC .......... *H04L 5/0044* (2013.01); *H04L 1/0003* (2013.01); *H04L 1/0025* (2013.01); *H04L 1/0057* (2013.01)

(58) Field of Classification Search
CPC ... H04L 5/0044; H04L 1/0003; H04L 1/0025; H04L 1/0057; H04L 1/0041;
(Continued)

(56) References Cited

U.S. PATENT DOCUMENTS

2013/0121278 A1*  5/2013  Noh ...................... H04L 5/0041
                                                                370/329
2013/0201932 A1*  8/2013  Ko ........................ H04L 5/0053
                                                                370/329
(Continued)

FOREIGN PATENT DOCUMENTS

CN          109600205 A      4/2019

OTHER PUBLICATIONS

English Translation of Chinese Search Report dated Feb. 7, 2024, for the corresponding Chinese Patent Application No. 202180020495. 2, 3 pages.
(Continued)

*Primary Examiner* — Afshawn M Towfighi
(74) *Attorney, Agent, or Firm* — Seed Intellectual Property Law Group LLP

(57) ABSTRACT

The present disclosure provides communication apparatus and communication method for transmission over combinations of multiple resource units. The communication apparatus comprises: circuitry, which, in operation, generates a physical layer protocol data unit (PPDU) comprising a signal field and a data field, the signal field comprising a resource unit (RU) allocation field and one or more user specific field and the data field comprising one or more physical layer service data unit (PSDU); and a transmitter
(Continued)

which, in operation, transmits the generated PPDU, wherein a single PSDU of the one or more PSDU is transmitted over a RU combination, and whether two or more RUs of the RU combination share a single low density parity check tone mapper depends on the size of the two or more RUs of the RU combination.

14 Claims, 20 Drawing Sheets

(58) Field of Classification Search
CPC ... H04L 1/0045; H04L 1/0006; H04L 1/0063; H04L 5/0003; H04L 5/0048; H04L 5/0058; H04W 84/12
See application file for complete search history.

(56) References Cited

U.S. PATENT DOCUMENTS

| | | | |
|---|---|---|---|
| 2015/0208387 A1* | 7/2015 | Awad | H04W 72/23 370/329 |
| 2016/0105836 A1* | 4/2016 | Seok | H04W 72/23 370/331 |
| 2016/0174200 A1* | 6/2016 | Seok | H04L 27/2613 370/329 |
| 2018/0248591 A1 | 8/2018 | Geng et al. | |
| 2018/0302256 A1 | 10/2018 | Huang et al. | |
| 2019/0238288 A1 | 8/2019 | Liu et al. | |
| 2020/0389934 A1* | 12/2020 | Liu | H04L 5/0041 |
| 2021/0050962 A1* | 2/2021 | Yu | H04L 5/0091 |
| 2022/0303052 A1* | 9/2022 | Chen | H04L 1/0009 |

OTHER PUBLICATIONS

Noh et al., "11be Channelization discussion," IEEE document 802.11-19/1911r0, slide 1-9, Nov. 10, 2019.
Extended European Search Report dated Jul. 14, 2023, for the corresponding European Patent Application No. 21767142.9, 10 pages.
Schelstraete et al., "Further considerations for multi-RU," doc.: IEEE 802.11-20/0109, Jan. 10, 2020, 13 pages.
Yu et al., "Multiple RU discussion," doc.: IEEE 802.11-19/1914r2, Nov. 6, 2019, 10 pages.
Asterjadhi, et al., "Compendium of motions related to the contents of the TGbe specification framework document," IEEE 802.11-19/1755r2, Jan. 21, 2020. (120 pages).
Au, "Specification framework for TGbe," IEEE 802.11-19/1262r8, Feb. 11, 2020. (20 pages).
International Search Report, mailed Apr. 28, 2021, for International Patent Application No. PCT/SG2021/050052. (4 pages).

* cited by examiner

| CBW (MHz) | Number of EHT-SIG content channels |
|---|---|
| 20 | 1 |
| 40 | 2 |
| 80 | 2 |
| 80+80, 160 | 4 |
| 160+80, 240 | 6 |
| 160+160, 320 | 8 |

COMMUNICATION APPARATUS AND COMMUNICATION METHOD FOR TRANSMISSION OVER COMBINATIONS OF MULTIPLE RESOURCE UNITS

TECHNICAL FIELD

The present disclosure relates to communication apparatus and communication method for transmission over combinations of multiple resource units, and more particularly to communication apparatuses and methods for transmission over combinations of multiple resource units in EHT WLAN (extremely high throughput wireless local area network).

BACKGROUND

In the standardization of next generation wireless local area network (WLAN), a new radio access technology having backward compatibilities with IEEE 802.11a/b/g/n/ac/ax technologies has been discussed in the IEEE 802.11 Working Group and is named IEEE 802.11be Extremely High Throughput (EHT) WLAN.

In 802.11be EHT WLAN, in order to provide significant peak throughput and capacity increase beyond 802.11ax high efficiency (HE) WLAN, it is desired to increase the maximum channel bandwidth from 160 MHz to 320 MHz, increase the maximum number of spatial streams from 8 to 16 and to support multi-link operation. Further, in order to improve spectral efficiency over 11ax HE WLAN, it has been proposed to allow multiple contiguous and non-contiguous resource units (RUs) assigned to a single communication apparatus in an EHT physical layer protocol data unit (PPDU) transmitted to multiple communication apparatuses.

However, there has been no much discussion on communication apparatuses and methods for efficient transmission over multiple RUs assigned to a single communication apparatus in an EHT PPDU.

There is thus a need for communication apparatuses and methods that provide feasible technical solutions for transmission over combinations of multiple RUs in the context of EHT WLAN. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for transmissions over combinations of multiple resource units in context of EHT WLAN.

In a first aspect, the present disclosure provides a communication apparatus comprising: circuitry, which, in operation, generates a physical layer protocol data unit (PPDU) comprising a signal field and a data field, the signal field comprising a resource unit (RU) allocation field and one or more user specific field and the data field comprising one or more physical layer service data unit (PSDU); and a transmitter, which, in operation, transmits the generated PPDU, wherein a single PSDU of the one or more PSDU is transmitted over a RU combination, and whether two or more RUs of the RU combination share a single low density parity check (LDPC) tone mapper depends on the size of the two or more RUs of the RU combination.

In a second aspect, the present disclosure provides a communication method comprising: generating a PPDU comprising a signal field and a data field, the signal field comprising a RU allocation field and one or more user specific field and the data field comprising one or more PSDU; and transmitting the generated PPDU, wherein a single PSDU of the one or more PSDU is transmitted over a RU combination, and whether the two or more RUs of the RU combination share a single LDPC tone mapper depends on the size of the two or more RUs of the RU combination.

In a third aspect, the present disclosure provides a communication apparatus comprising: a receiver, which, in operation, receives a PPDU comprising a signal field and a data field, the signal field comprising a RU allocation field and one or more user specific field and the data field comprising one or more PSDU; and circuitry, which, in operation, processes the received PPDU, wherein a single PSDU of the one or more PSDU is transmitted over a RU combination, and whether two or more RUs of the RU combination share a single LDPC tone mapper depends on the size of the two or more RUs of the RU combination It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which.

Figure 1A:
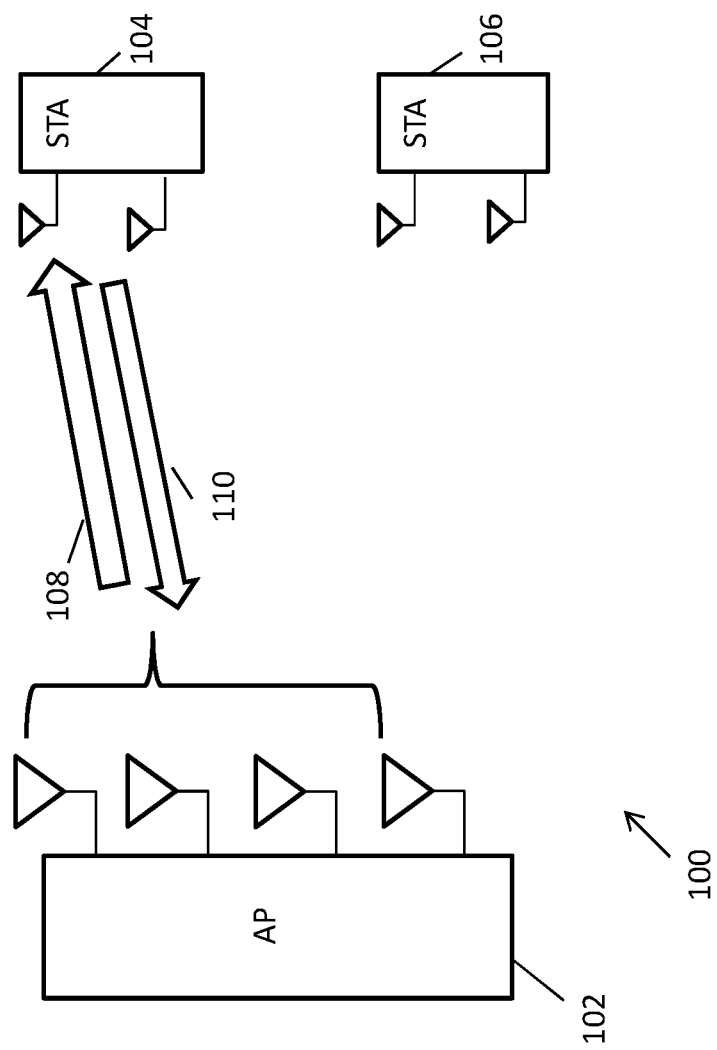
FIG. 1A depicts a schematic diagram of uplink and downlink single-user (SU) multiple input multiple output (MIMO) communication between an access point (AP) and a station (STA) in a MIMO wireless network.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help an accurate understanding of the present embodiments.

DETAILED DESCRIPTION

Some embodiments of the present disclosure will be described, by way of example only, with reference to the drawings. Like reference numerals and characters in the drawings refer to like elements or equivalents.

In the following paragraphs, certain exemplifying embodiments are explained with reference to an access point (AP) and a station (STA) for transmission over combinations of multiple resource units, especially in a multiple-input multiple-output (MIMO) wireless network.

In the context of IEEE 802.11 (Wi-Fi) technologies, a station, which is interchangeably referred to as a STA, is a communication apparatus that has the capability to use the 802.11 protocol. Based on the IEEE 802.11-2016 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

In a MIMO wireless network, "multiple" refers to multiple antennas used simultaneously for transmission and multiple antennas used simultaneously for reception, over a radio channel. In this regard, "multiple-input" refers to multiple transmitter antennas, which input a radio signal into the channel, and "multiple-output" refers to multiple receiver antennas, which receive the radio signal from the channel and into the receiver. For example, in an N×M MIMO network system, N is the number of transmitter antennas, M is the number of receiver antennas, and N may or may not be equal to M. For the sake of simplicity, the respective numbers of transmitter antennas and receiver antennas are not discussed further in the present disclosure.

In a MIMO wireless network, single-user (SU) communications and multi-user (MU) communications can be deployed for communications between communication apparatuses such as APs and STAs. MIMO wireless network has benefits like spatial multiplexing and spatial diversity, which enable higher data rates and robustness through the use of multiple spatial streams. According to various embodiments, the term "spatial stream" may be used interchangeably with the term "space-time stream" (or STS).

FIG. 1A depicts a schematic diagram of SU communication 100 between an AP 102 and a STA 104 in a MIMO wireless network. As shown, the MIMO wireless network may include one or more STAs (e.g. STA 104, STA 106, etc.). If the SU communication 100 in a channel is carried out over whole channel bandwidth, it is called full bandwidth SU communication. If the SU communication 100 in a channel is carried out over a part of the channel bandwidth (e.g. one or more 20 MHz subchannels within the channel is punctured), it is called punctured SU communication. In the SU communication 100, the AP 102 transmits multiple space-time streams using multiple antennas (e.g. four antennas as shown in FIG. 1A) with all the space-time streams directed to a single communication apparatus, i.e. the STA 104. For the sake of simplicity, the multiple space-time streams directed to the STA 104 are illustrated as a grouped data transmission arrow 108 directed to the STA 104.

The SU communication 100 can be configured for bi-directional transmissions. As shown in FIG. 1A, in the SU communication 100, the STA 104 may transmit multiple space-time streams using multiple antennas (e.g. two antennas as shown in FIG. 1A) with all the space-time streams directed to the AP 102. For the sake of simplicity, the multiple space-time streams directed to the AP 102 are illustrated as a grouped data transmission arrow 110 directed to the AP 102.

As such, the SU communication 100 depicted in FIG. 1A enables both uplink and downlink SU transmissions in a MIMO wireless network.

Figure 1B:
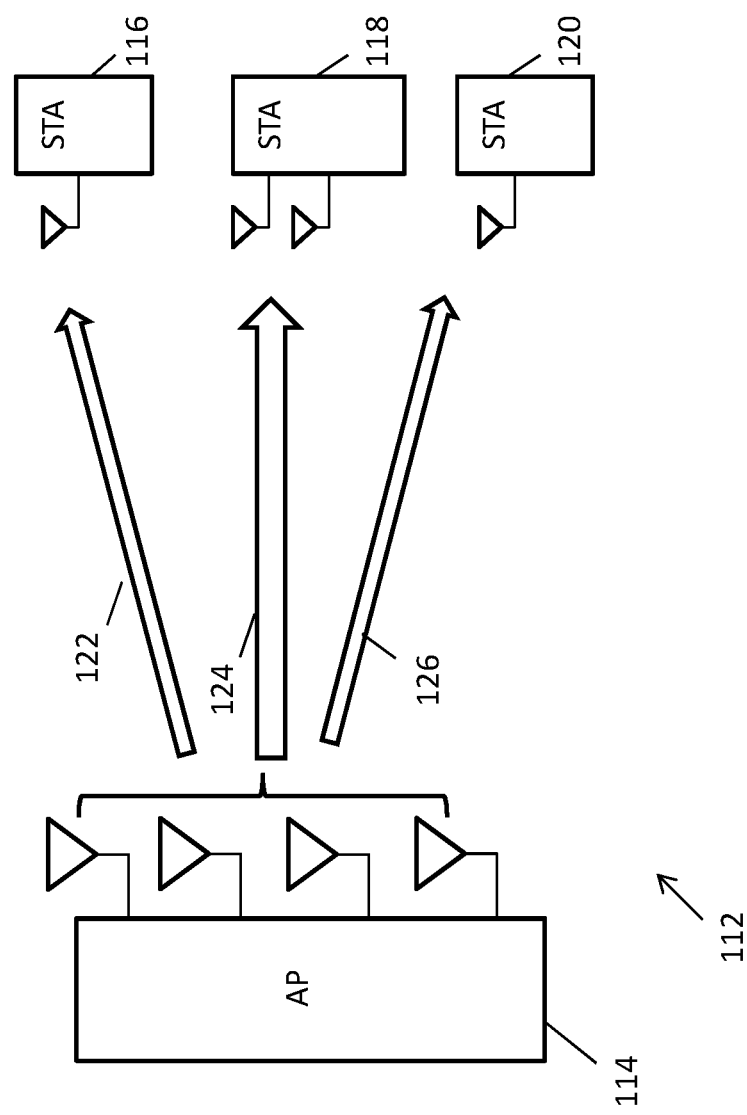
FIG. 1B depicts a schematic diagram of downlink multi-user (MU) communication between an AP and multiple STAs in a MIMO wireless network.

FIG. 1B depicts a schematic diagram of downlink MU communication 112 between an AP 114 and multiple STAs 116, 118, 120 in a MIMO wireless network. The MIMO wireless network may include one or more STAs (e.g. STA 116, STA 118, STA 120, etc.). The MU communication 112 can be an OFDMA (orthogonal frequency division multiple access) communications or a MU-MIMO communication. For an OFDMA communication in a channel, the AP 114 transmits multiple streams simultaneously to the STAs 116, 118, 120 in the network at different resource units (RUs) within the channel bandwidth. For a MU-MIMO communication in a channel, the AP 114 transmits multiple streams simultaneously to the STAs 116, 118, 120 at same RU(s) within the channel bandwidth using multiple antennas via spatial mapping or precoding techniques. If the RU(s) at which the OFDMA or MU-MIMO communication occurs occupy whole channel bandwidth, the OFDMA or MU-MIMO communications is called full bandwidth OFDMA or MU-MIMO communications. If the RU(s) at which the OFDMA or MU-MIMO communication occurs occupy a part of channel bandwidth (e.g. one or more 20 MHz subchannel within the channel is punctured), the OFDMA or MU-MIMO communication is called punctured OFDMA or MU-MIMO communications. For example, two space-time streams may be directed to the STA 118, another space-time stream may be directed to the STA 116, and yet another space-time stream may be directed to the STA 120. For the sake of simplicity, the two space-time streams directed to the STA 118 are illustrated as a grouped data transmission arrow 124, the space-time stream directed to the STA 116 is illustrated as a data transmission arrow 122, and the space-time stream directed to the STA 120 is illustrated as a data transmission arrow 126.

To enable uplink MU transmissions, trigger-based communication is provided to the MIMO wireless network. In this regard, FIG. 1C depicts a schematic diagram of trigger-based uplink MU communication 128 between an AP 130 and multiple STAs 132, 134, 136 in a MIMO wireless network.

Since there are multiple STAs 132, 134, 136 participating in the trigger-based uplink MU communication, the AP 130 needs to coordinate simultaneous transmissions of multiple STAs 132, 134, 136.

Figure 1C:
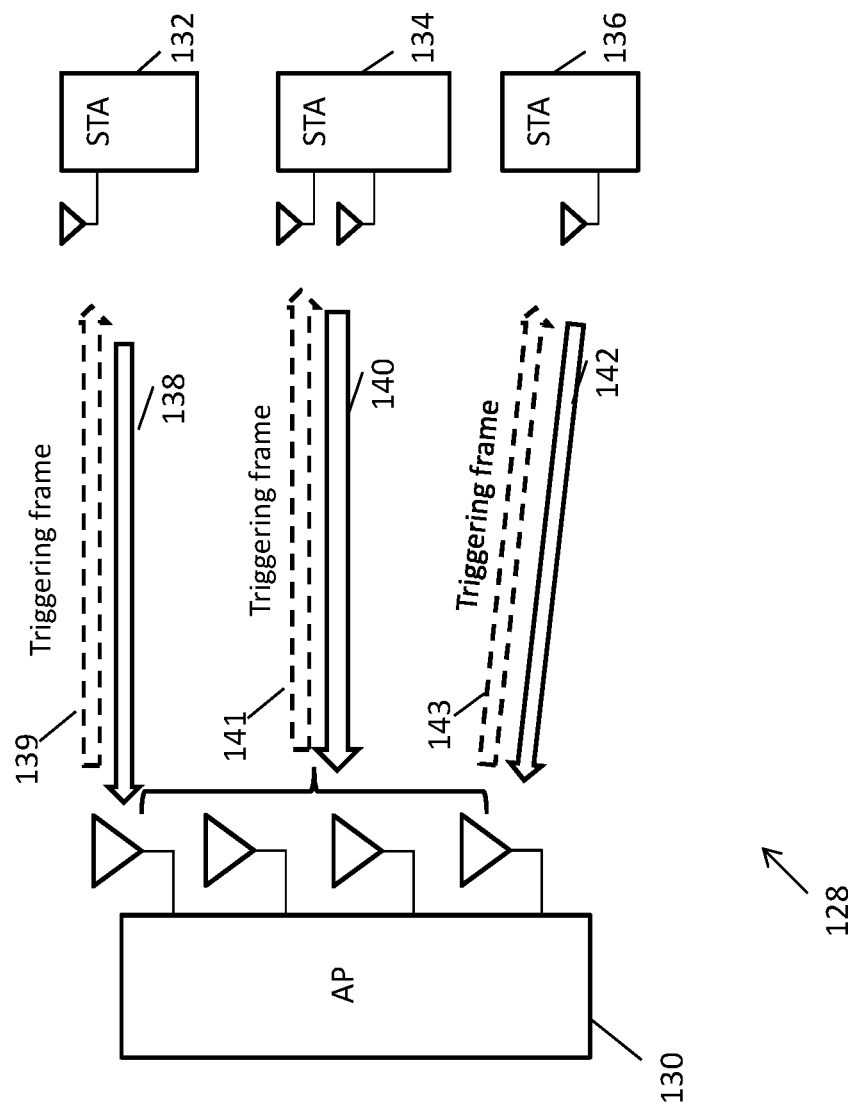
FIG. 1C depicts a schematic diagram of trigger-based uplink MU communication between an AP and multiple STAs in a MIMO wireless network.

To do so, as shown in FIG. 1C, the AP 130 transmits triggering frames 139, 141, 143 simultaneously to STAs 132, 134, 136 to indicate user-specific resource allocation information (e.g. the number of space-time streams, a starting STS number and the allocated RUs) each STA can use. In response to the triggering frames, STAs 132, 134, 136 may then transmit their respective space-time streams simultaneously to the AP 130 according to the user-specific resource allocation information indicated in the triggering frames 139, 141, 143. For example, two space-time streams may be directed to the AP 130 from STA 134, another space-time stream may be directed to the AP 130 from STA 132, and yet another space-time stream may be directed to the AP 130 from STA 136. For the sake of simplicity, the two space-time streams directed to the AP 130 from STA 134 are illustrated as a grouped data transmission arrow 140, the space-time stream directed to the AP 130 from STA 132 is illustrated as a data transmission arrow 138, and the space-time stream directed to the AP 130 from STA 136 is illustrated as a data transmission arrow 142.

Trigger-based communication is also provided to the MIMO wireless network to enable downlink multi-AP communication. In this regard, FIG. 1D depicts a schematic diagram of downlink multi-AP communication 144, between a STA 150 and multiple APs 146, 148 in a MIMO wireless network.

Since there are multiple APs 146, 148 participating in the trigger-based downlink multi-AP MIMO communication, the master AP 146 needs to coordinate simultaneous transmissions of multiple APs 146, 148.

Figure 1D:
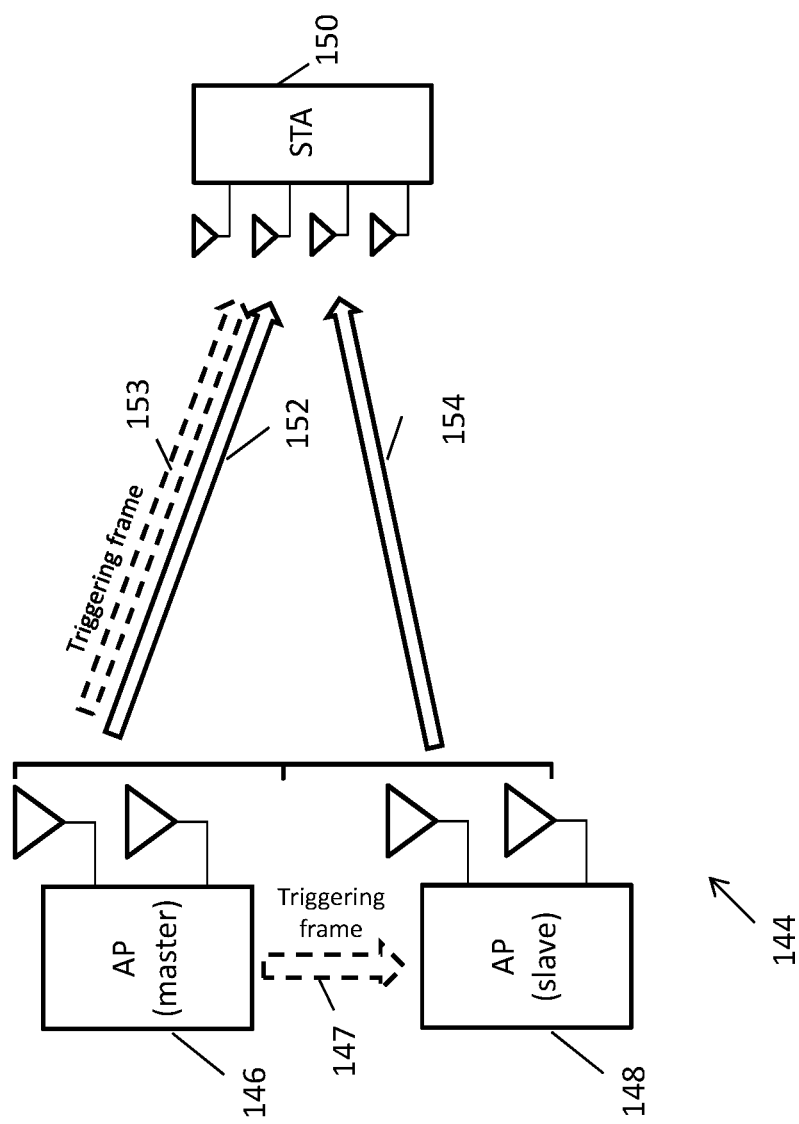
FIG. 1D depicts a schematic diagram of trigger-based downlink multi-AP communication between multiple APs and a STA in a MIMO wireless network.

To do so, as shown in FIG. 1D, the master AP 146 transmits triggering frames 147, 153 simultaneously to the AP 148 and the STA 150 to indicate AP-specific resource allocation information (e.g. the number of space-time streams, a starting STS stream number and the allocated RUs) each AP can use. In response to the triggering frames, the multiple APs 146, 148 may then transmit respective space-time streams to the STA 150 according to the AP-specific resource allocation information indicated in the triggering frame 147; and the STA 150 may then receive all the space-time streams according to the AP-specific resource allocation information indicated in the triggering frame 153. For example, two space-time streams may be directed to the STA 150 from AP 146, and another two space-time streams may be directed to the STA 150 from AP 148. For the sake of simplicity, the two space-time streams directed to the STA 150 from AP 146 are illustrated as a grouped data transmission arrow 152, and the two space-time streams directed to the STA 150 from the AP 148 is illustrated as a grouped data transmission arrow 154.

Due to packet/PPDU (physical layer protocol data unit) based transmission and distributed MAC (medium access control) scheme in 802.11 WLAN, time scheduling (e.g. TDMA (time division multiple access)-like periodic time slot assignment for data transmission) does not exist in 802.11 WLAN. Frequency and spatial resource scheduling is performed on a packet basis. In other words, resource allocation information is on a PPDU basis.

Figure 2A:
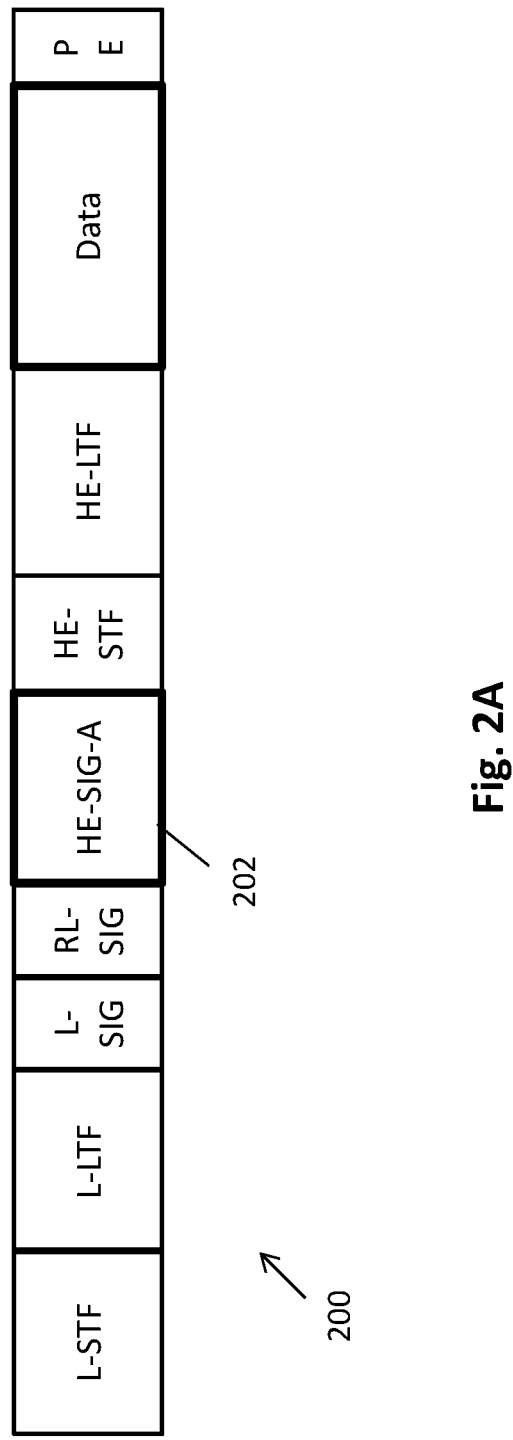
FIG. 2A depicts an example format of a PPDU (physical layer protocol data unit) used for uplink and downlink SU communications between an AP and a STA in an HE WLAN.

FIG. 2A depicts an example format of a PPDU 200 used for SU communications between an AP and a STA in a HE WLAN. Such a PPDU 200 is referred to as an HE SU PPDU 200. The HE SU PPDU 156 may include a non-High Throughput Short Training Field (L-STF), a non-High Throughput Long Training Field (L-LTF), a non-High Throughput SIGNAL (L-SIG) field, a Repeated L-SIG (RL-SIG) field, a HE SIGNAL A (HE-SIG-A) field 202, a HE Short Training Field (HE-STF), a HE Long Training Field (HE-LTF), a Data field and a Packet Extension (PE) field. The RL-SIG field is mainly used for identifying the format of an HE PPDU. The HE-SIG-A field 202 contains the necessary control information for decoding the Data field, such as uplink/downlink, modulation and coding scheme (MCS) and bandwidth (BW).

Figure 2B:
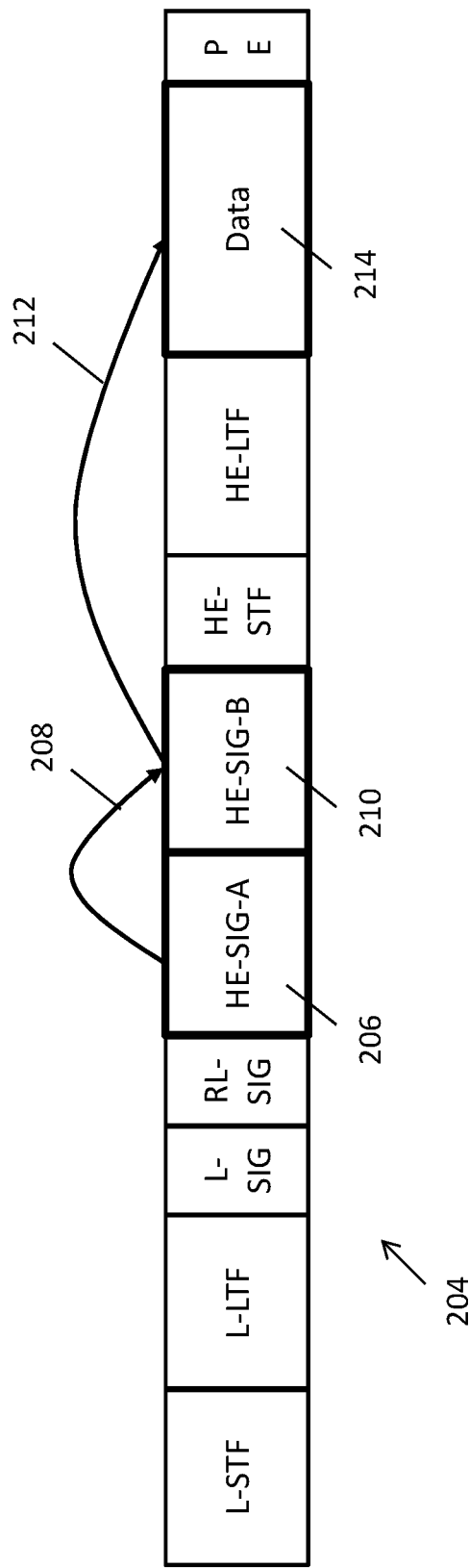
FIG. 2B depicts an example format of a PPDU used for downlink MU communications between an AP and multiples STAs in an HE WLAN.

FIG. 2B shows an example format of a PPDU 204 used for downlink MU communications between an AP and multiple STAs in a HE WLAN, e.g. OFDMA transmission and full bandwidth MU-MIMO transmission. Such a PPDU 204 is referred to as an HE MU PPDU 204. A HE MU PPDU may have a similar format as HE SU PPDU but include a HE SIGNAL B (HE-SIG-B) field 210. In particular, the HE MU PPDU 204 may include a L-STF, L-LTF, L-SIG, R-SIG, HE-SIG-A field 206, HE-SIG-B field 210, a HE-STF, a HE-LTF, a Data field 214 and a PE field. In the HE MU PPDU 204, the HE-SIG-B field 210 provides the OFDMA and MU-MIMO resource allocation information to allow STAs to look up the corresponding resources to be used in the Data field 170, like indicated by an arrow 212. The HE-SIG-A field 206 contains the necessary information for decoding the HE-SIG-B field 210, e.g. MCS for HE-SIG-B, number of HE-SIG-B symbols, like indicated by an arrow 208.

Figure 2C:
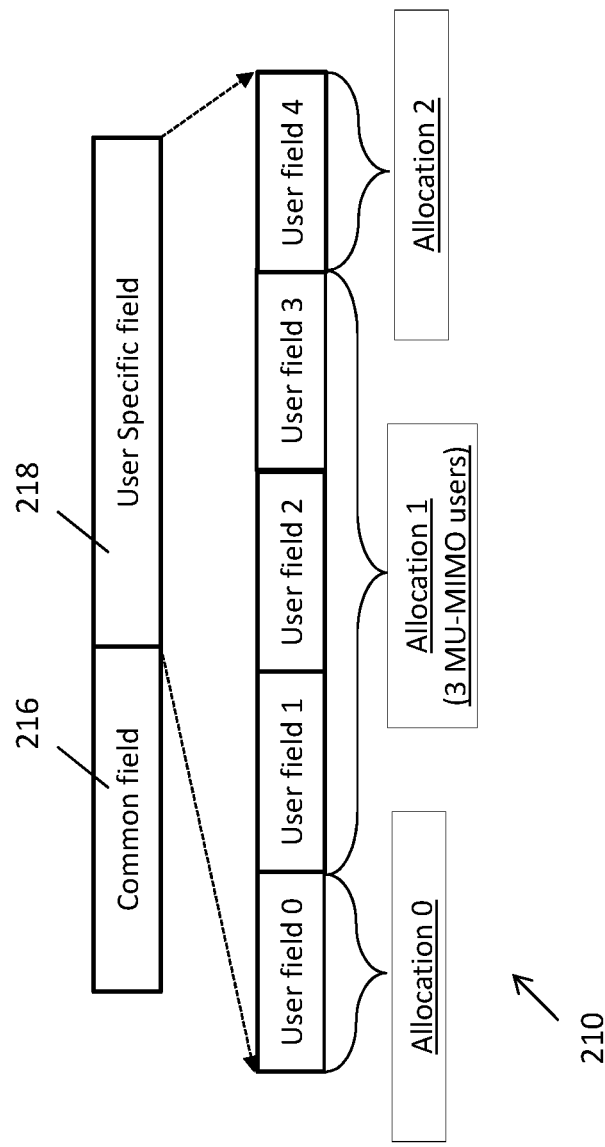
FIG. 2C depicts the HE-SIG-B field in more details.

FIG. 2C depicts the HE-SIG-B field 210 in more detail. The HE-SIG-B field 210 includes (or consists of) a Common field 216, if present, followed by a User Specific field 218 which together are referred to as the HE-SIG-B content channel. The HE-SIG-B field 210 contains a RU Allocation subfield which indicates the RU information for each of the allocations. The RU information includes a RU position in the frequency domain, an indication of the RU allocated for a non-MU-MIMO or MU-MIMO allocation, and the number of users in the MU-MIMO allocation. The Common field 216 is not present in the case of a full bandwidth MU-MIMO transmission. In this case, the RU information (e.g. the number of users in the MU-MIMO allocation) is indicated in the HE-SIG-A field 162.

The User Specific field 218 includes (or consists of) one or more User field(s) for non-MU-MIMO allocation(s) and/or MU-MIMO allocation(s). A User field contains user information indicating a user-specific allocation (i.e. user-specific allocation information). In the example shown in FIG. 2C, the User Specific field 218 includes five user fields (User field 0, . . . , User field 4), wherein user-specific allocation information for an allocation (Allocation 0) is provided by User field 0, user-specific allocation information for a further allocation (Allocation 1 with 3 MU-MIMO users) is provided by User field 1, User field 2, and User field 3, and user-specific allocation information for yet a further allocation (Allocation 2) is provided by User field 4.

Figure 2D:
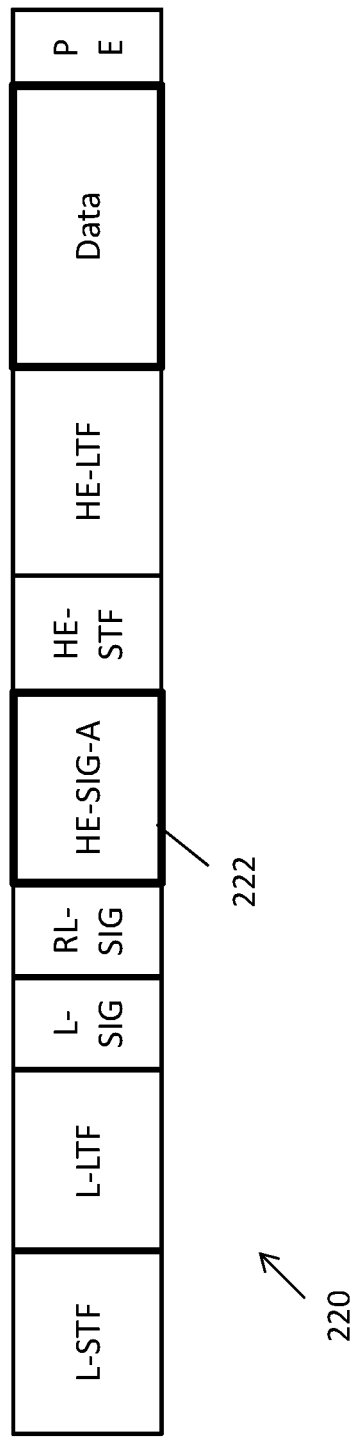
FIG. 2D depicts an example format of a PPDU used for trigger-based uplink MU communications between an AP and multiple STAs in an HE WLAN.

FIG. 2D shows a format of a PPDU 220 used for uplink MU communications between an AP and multiple STAs in a HE WLAN. Such a PPDU 220 is referred to as an HE TB (trigger-based) PPDU 220. A HE TB PPDU may have a similar format as HE SU PPDU. In particular, the HE TB PPDU 220 may include a L-STF, a L-LTF, a L-SIG field, a RL-SIG field, a HE-SIG-A field 222, a HE-STF, a HE-LTF, a Data field and a PE field. The HE-STF of HE TB PPDU 220 has a duration of 8 µs. The HE TB PPDU 220 is used for uplink MU transmission that is in response to a triggering frame. Instead of using the HE-SIG-B field, the information required for the uplink MU transmission from one or more STAs is carried by the triggering frame that solicits this transmission. In a typical transmission of the HE TB PPDU 220, HE-SIG-A related information is copied from the soliciting triggering frame into the HE-SIG-A field 222 of the HE TB PPDU 220.

In 802.11ax HE WLAN, only a single resource unit (RU) is allowed to be assigned to a STA. With the increase in the maximum channel bandwidth from 160 MHz to 320 MHz, the increase in the maximum number of spatial streams from 8 to 16 and the increased support of multi-link operation in 802.11be EHT WLAN, it is an object of present disclosure to substantially overcome the existing challenges to provide communication apparatuses and methods for transmission over combinations of multiple RUs wherein multiple contiguous or non-contiguous RUs may be assigned to a STA in order to improve spectral efficiency of 802.11be EHT WLAN over 802.11ax HE WLAN.

According to the present disclosure, for achieving tradeoff between bandwidth utilization and scheduling complexity, small-size RUs can only be combined with small-size RUs and large-size RUs can only be combined with large-size RUs. In various embodiments, RUs with equal to or more than 242 tones are defined as large-size RUs while RUs with less than 242 tones are defined as small-size RUs.

According to the present disclosure, combination of small-size RUs shall not cross 20 MHz channel boundary. Two adjacent 26-tone RU and 52-tone RU or two adjacent 26-tone RU and 106-tone RU can be combined and assigned to a single STA for OFDMA transmission in a 20 MHz, 40 MHz or 80 MHz channel. For OFDMA transmission in a channel with bandwidth larger than 80 MHz, small-size RU combination is disallowed for achieving tradeoff between bandwidth utilization and scheduling complexity.

According to the present disclosure, for achieving tradeoff between bandwidth utilization and scheduling complexity, only one 242-tone RU and one 484-tone RU can be combined and assigned to one STA for OFDMA transmission in an 80 MHz channel; and only one 484-tone RU and one 996-tone RU can be combined and assigned to one STA for OFDMA transmission in a 160 MHz channel. In terms of OFDMA transmission in a 240 MHz channel, for one STA, large-size RU combination is allowed only within 160 MHz channel which is composed of two adjacent 80 MHz channels. In terms of OFDMA transmission in 160+80 MHz channel, for one STA, large-size RU combination is allowed only within 160 MHz channel or the other 80 MHz channel. In terms of OFDMA transmission in a 320 MHz or 160+160 MHz channel, for one STA, large-size RU combination is allowed only within primary 160 MHz channel or secondary 160 MHz channel, except the case that three 996-tone RUs are combined for one STA. Note that the primary 160 MHz channel is composed of primary 80 MHz channel and secondary 80 MHz channel and the secondary 160 MHz channel is 160 MHz channel other than the primary 160 MHz channel in the 320 MHz or 160+160 MHz channel.

According to the present disclosure, for non-OFDMA transmission in an 80 MHz channel, any of four 242-tone RUs can be punctured, i.e. one 242-tone RU and one 484-tone RU can be combined. It is noted that non-OFDMA transmission comprises SU transmission and MU-MIMO transmission. For non-OFDMA transmission in a 160 MHz or 80+80 MHz channel, any of eight 242-tone RUs or any of four 484-tone RUs can be punctured, i.e. one 242-tone RU, one 484-tone RU and one 996-tone RU can be combined or one 484-tone RU and one 996-tone RU can be combined. For non-OFDMA transmission in a 240 MHz or 160+80 MHz channel, any of six 484-tone RUs or any of three 996-tone RUs can be punctured, i.e. one 484-tone RU and two 996-tone RUs can be combined or two 996-tone RUs can be combined. For non-OFDMA transmission in a 320 MHz or 160+160 MHz channel, any of eight 484-tone RUs or any of four 996-tone RUs can be punctured, i.e. one 484-tone RU and three 996-tone RUs can be combined or three 996-tone RUs can be combined.

Figure 3A:
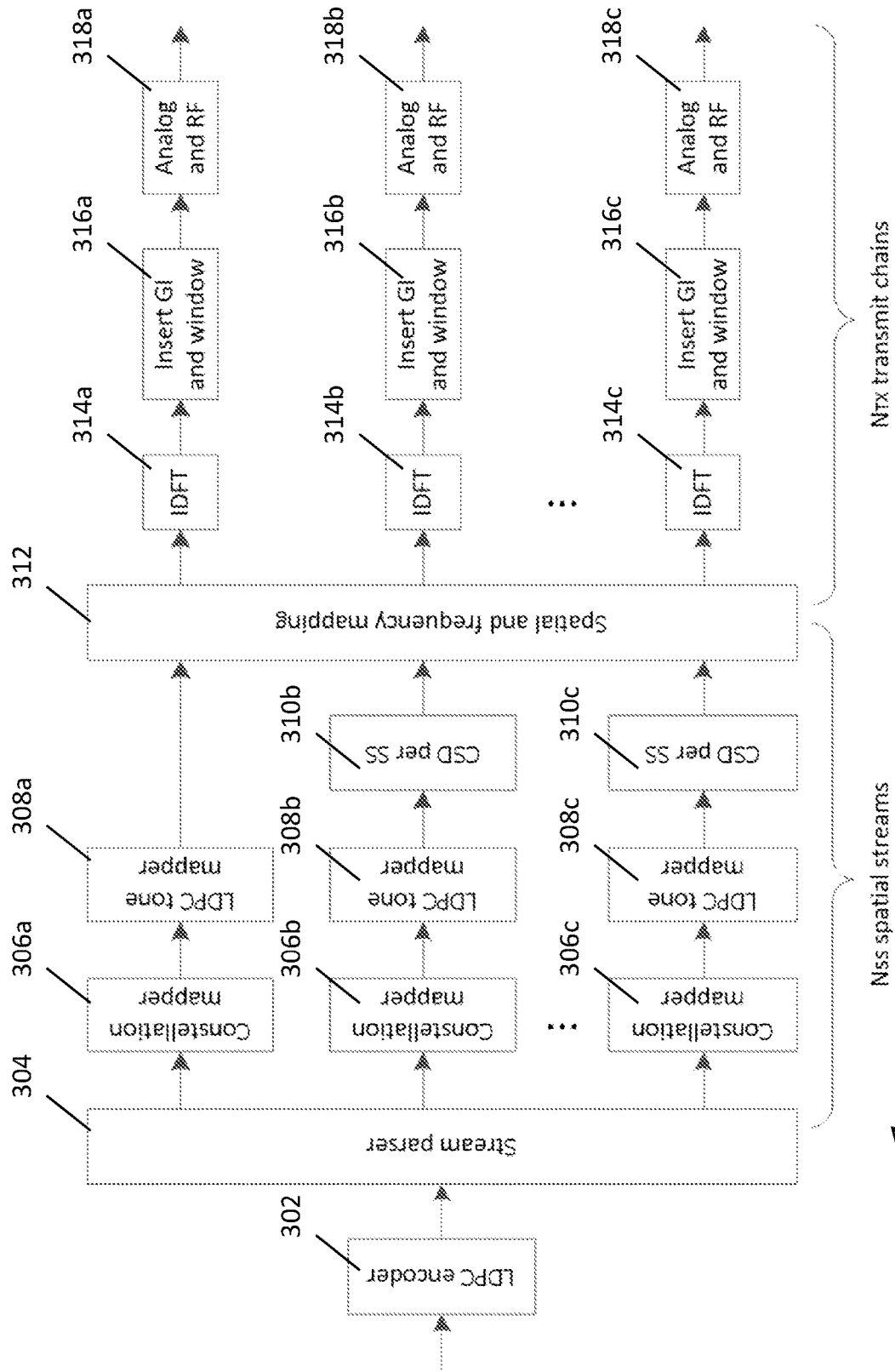
FIG. 3A depicts an example transmitter processing used to process a physical layer service data unit (PSDU) of a user to be transmitted at a small-size RU combination in orthogonal frequency division multiple access (OFDMA) transmission.

FIG. 3A depicts an example transmitter processing 300 used to process a physical layer service data unit (PSDU) of a user to be transmitted at a small-size RU combination in OFDMA transmission. The data field of an EHT basic PPDU or an EHT TB PPDU comprises a single PSDU per user. The data field for a user can be generated using a transmitter consisting of the following processing blocks. The transmitter processing may start with a low density parity check (LDPC) encoder 302 encoding data such as adding redundant information to the data stream that may allow detection and correction of errors before the encoded data is output to a stream parser 304. The stream parser 304 may then divide the encoded bits from the LDPC encoder 302 into multiple blocks that are sent through multiple spatial streams ($N_{SS}$ is the number of spatial streams) correspondingly. For the sake of simplicity, only three spatial streams ($N_{SS}$=3) are illustrated in this example. Each spatial stream corresponding to a block of the encoded bits that is sent to a constellation mapper like 306a, 306b, 306c and a LDPC tone mapper like 308a, 308b, 308c. In various embodiments, the constellation mappers 306a, 306b, 306c map respective blocks of the encoded bits into constellation points (complex numbers) using a selected modulation, and the LDPC tone mappers

308*a*, 308*b*, 308*c* map respective constellation points (complex numbers) to OFDM (orthogonal frequency-division multiplexing) subcarriers and ensure respective OFDM subcarriers are separated by a sufficient distance to maximize frequency diversity gain.

When multiple spatial streams are present, a phase shift is applied to each spatial stream to avoid unintentional beamforming. Such phase shift is referred to as cyclic shift diversity (CSD). In an embodiment, as shown in CSD per SS 310*b*, 310*c*, different phase shift or CSD values are applied to different spatial streams other than the first spatial stream, that is, spatial stream output from the LDPC tone mapper 308*a*.

Subsequently, spatial streams will be sent to a spatial and frequency mapping unit 312 and mapped onto one or more RU allocated to the user and multiple transmit chains ($N_{TX}$ is the number is transmit chains). The one or more RU allocated to the user may be a small-size RU combination. In various embodiments, each spatial stream is mapped onto a transmit chain by the spatial and frequency mapping unit 312 and sent to an Inverse Fourier Discrete Fourier Transform (IDFT) unit 314*a*, 314*b*, 314*c* respectively. In this example, the three spatial streams are mapped onto three transmit chains through the spatial and frequency mapping unit 312 respectively. In various embodiments, each of the IDFT units 314*a*, 314*b*, 314*c* converts OFDM subcarriers on a transmit chain, which are frequency-domain data, into time-domain data for transmission. The time-domain data of each of the IDFT units like 314*a*, 314*b*, 314*c* is then sent to an Insert Guard Interval (GI) and window unit 316*a*, 316*b*, 316*c* correspondingly to insert GI at the start of each OFDM symbol where each OFDM symbol may also be windowed to minimize adjacent channel interference. The time-domain data in each transmit chain is then sent to an Analog and RF section like 318*a*, 318*b*, 318*c* to prepare the data for transmission through an antenna.

Figure 3B:
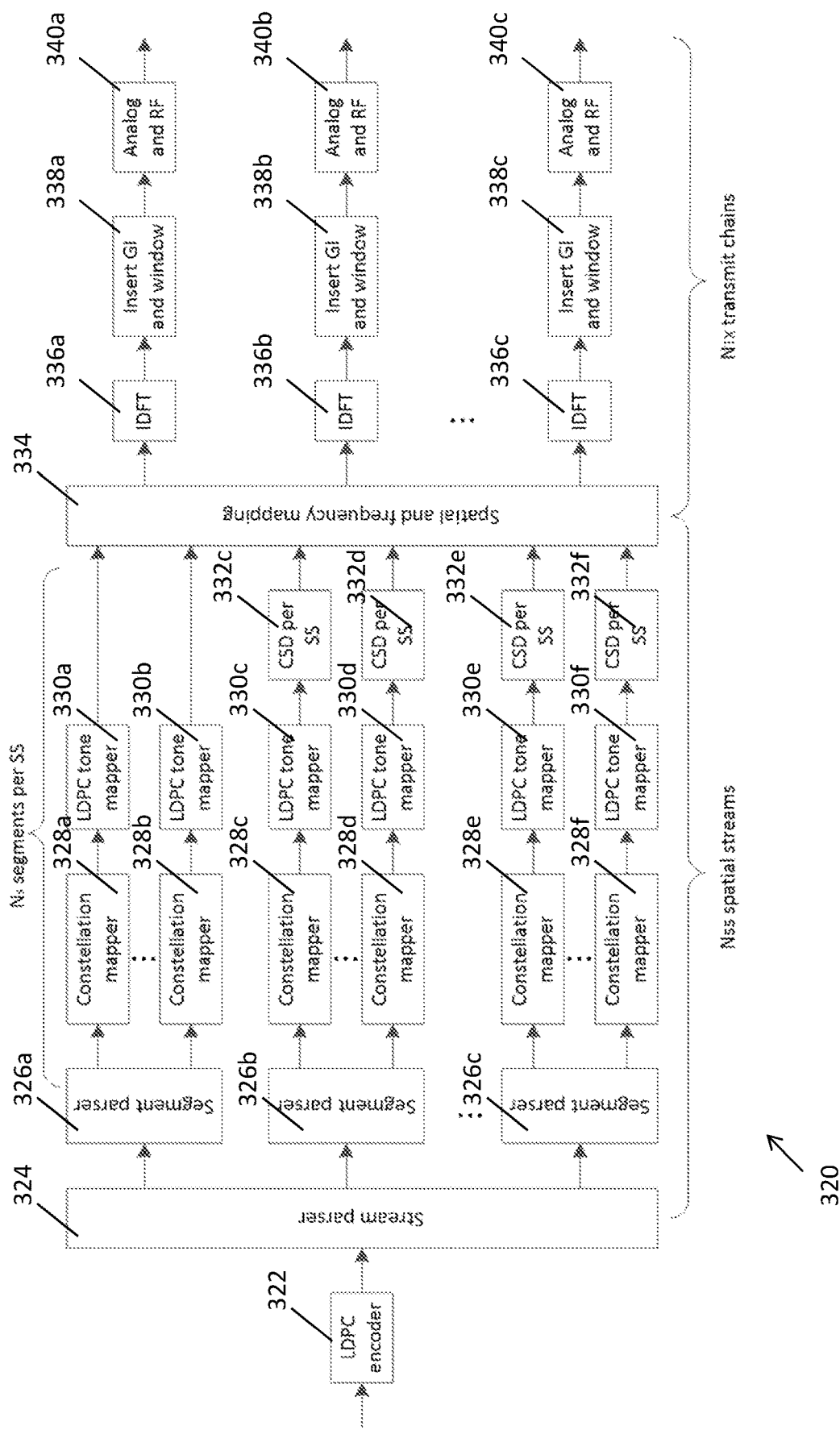
FIG. 3B depicts an example transmitter processing used to process a PSDU of a user at a large-size RU combination in OFDMA transmission or non-OFDMA transmission.

FIG. 3B depicts an example transmitter processing 320 used to process a PSDU of a user at a large-size RU combination in OFDMA transmission or non-OFDMA transmission. The data field of an EHT basic PPDU or an EHT TB PPDU comprises a single PSDU per user. The data field for a user can be generated using a transmitter consisting of the following processing blocks. The transmitter processing may start with a LDPC encoder 322 encoding data such as adding redundant information to the data stream that may allow detection and correction of errors before the encoded data is output to a stream parser. The stream parser 324 may then divide the encoded bits from the LDPC encoder 322 into multiple blocks that are sent through multiple spatial streams ($N_{SS}$ is the number of spatial streams) correspondingly. In this example, each spatial stream corresponding to a block of the encoded bits that is sent to a segment parser like 326*a*, 326*b*, 326*c* to further divide each spatial stream to multiple segments ($N_s$ is the number of segments per spatial stream). For the sake of simplicity, only three spatial streams ($N_{SS}$=3) and two segments per spatial stream ($N_s$=2) are illustrated in this example. Each segment corresponds to a subblock of the encoded bits and is sent to a constellation mapper like 328*a*, 328*b*, 328*c*, 328*d*, 328*e*, 328*f* and then a LDPC tone mapper like 330*a*, 330*b* 330*c*, 330*d*, 330*e*, 330*f* respectively. In various embodiments, the constellation mappers 328*a*, 328*b*, 328*c*, 328*d*, 328*e*, 328*f* map respective segments of the encoded bits into constellation points (complex numbers) using a selected modulation, and the LDPC tone mappers 330*a*, 330*b* 330*c*, 330*d*, 330*e*, 330*f* map respective constellation points (complex numbers) to OFDM subcarriers and ensure respective OFDM subcarriers are separated by a sufficient distance to maximize frequency diversity gain.

When multiple spatial streams are present, a phase shift is applied to each spatial stream to avoid unintentional beamforming. Such phase shift is referred to as CSD. In an embodiment, as shown in CSD per SS unit 332*c*, 332*d*, 332*e*, 332*f*, different phase shift or CSD values are applied to different spatial streams other than the first spatial stream, i.e. output from the segment parser 326*a*. In this example where each spatial stream is divided into two segments, a same CSD value is applied to the two segments of a same spatial stream. For example, a same CSD value is apply in CSD per SS units 332*c*, 332*d* to both segments of the second spatial stream output from the segment parser 326*b* respectively; and another same CSD value is applied in CSD per SS units 332*e*, 332*f* to both segments of the third spatial stream output from the segment parser 326*c* respectively.

Subsequently, spatial streams will be sent to a spatial and frequency mapping unit 334 and mapped onto one or more RU allocated to the user and multiple transmit chains ($N_{TX}$ is the number is transmit chains). The one or more RU allocated to the user may be a large-size RU combination. In various embodiments, each spatial stream is mapped onto a transmit chain by the spatial and frequency mapping unit 334 and sent to an IDFT unit 336*a*, 336*b*, 336*c* respectively. In this example, the three spatial streams are mapped onto three transmit chains through the spatial and frequency mapping unit 334 respectively. In various embodiments, each of the IDFT units 336*a*, 336*b*, 336*c* converts OFDM subcarriers on a transmit chain, which are frequency-domain data, into time-domain data for transmission. The time-domain data of each of the IDFT units like 336*a*, 336*b*, 336*c* is then sent to an Insert GI and window unit 338*a*, 338*b*, 338*c* correspondingly to insert GI at the start of each OFDM symbol where each OFDM symbol may also be windowed to minimize adjacent channel interference. The time-domain data in each transmit chain is then sent to an Analog and RF section like 320*a*, 320*b*, 320*c* to prepare the data for transmission through an antenna.

According to various embodiments, EHT WLAN supports non-trigger-based communications as illustrated in FIG. 1A and FIG. 1B and trigger-based communications as illustrated in FIG. 1C and FIG. 1D. In non-trigger-based communications, a communication apparatus transmits a PPDU to one other communication apparatus or more than one other communication apparatuses in an unsolicited manner. In trigger-based communications, a communication apparatus transmits a PPDU to one other communication apparatus or more than one other communication apparatuses only after a soliciting triggering frame is received.

Figure 4A:
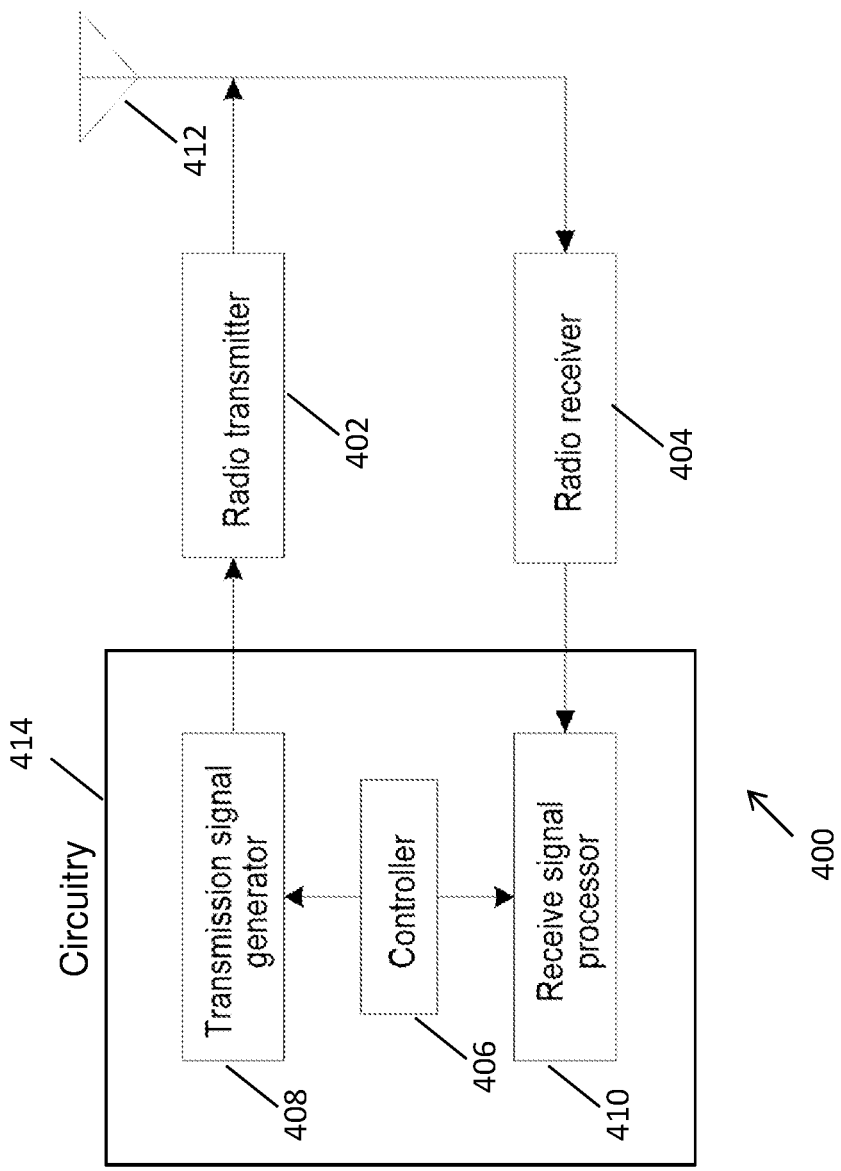
FIG. 4A shows a schematic example of communication apparatus in accordance with various embodiments. The communication apparatus may be implemented as an AP or a STA and configured for transmissions over combinations of multiple RUs in accordance with the present disclosure.

FIG. 4A shows a schematic, partially sectioned view of a communication apparatus 400 according to the present disclosure. The communication apparatus 400 may be implemented as an AP or an STA.

As shown in FIG. 4A, the communication apparatus 400 may include circuitry 414, at least one radio transmitter 402, at least one radio receiver 404, and at least one antenna 412 (for the sake of simplicity, only one antenna is depicted in FIG. 4A for illustration purposes). The circuitry 414 may include at least one controller 406 for use in software and hardware aided execution of tasks that the at least one controller 406 is designed to perform, including control of communications with one or more other communication apparatuses in a MIMO wireless network. The circuitry 414 may furthermore include at least one transmission signal generator 408 and at least one receive signal processor 410. The at least one controller 406 may control the at least one transmission signal generator 408 for generating PPDUs (for example EHT basic PPDUs used for non-trigger-based communications or EHT TB PPDUs used for trigger-based multi-AP joint transmission if the communication apparatus 400 is an AP, and for example EHT basic PPDUs used for non-trigger-based communications or EHT TB PPDUs used for trigger-based uplink transmissions if the communication apparatus 400 is a STA) to be sent through the at least one radio transmitter 402 to one or more other communication apparatuses and the at least one receive signal processor 410 for processing PPDUs (for example EHT basic PPDUs used for non-trigger-based communications or EHT TB PPDUs used for trigger-based uplink transmissions if the communication apparatus 400 is an AP, and for example EHT basic PPDUs used for non-trigger-based communications or EHT TB PPDUs used for trigger-based multi-AP joint transmission if the communication apparatus 400 is a STA) received through the at least one radio receiver 404 from the one or more other communication apparatuses under the control of the at least one controller 406. The at least one transmission signal generator 408 and the at least one receive signal processor 410 may be stand-alone modules of the communication apparatus 400 that communicate with the at least one controller 406 for the above-mentioned functions, as shown in FIG. 4A. Alternatively, the at least one transmission signal generator 408 and the at least one receive signal processor 410 may be included in the at least one controller 406. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 402, at least one radio receiver 404, and at least one antenna 412 may be controlled by the at least one controller 406.

The communication apparatus 400, when in operation, provides functions required for transmission over combinations of multiple RUs assigned to a single STA in an EHT PPDU. For example, the communication apparatus 400 may be an AP, and the circuitry 414 (for example the at least one transmission signal generator 408 of the circuitry 414) may, in operation, generate a transmission signal (for example an EHT basic PPDU used for non-trigger-based communications or an EHT TB PPDU used for trigger-based multi-AP joint transmission) comprising a signal field and a data field, the signal field comprising a RU allocation field and one or more user specific field and the data field comprising one or more PSDU. The radio transmitter 402 may in operation, transmit the generated transmission signal, wherein a single PSDU of the one or more PSDU is transmitted over a RU combination, and whether two or more RUs of the RU combination share a LDPC tone mapper depends on the size of the two or more RUs of the RU combination.

The communication apparatus 400 may be a STA, and the radio receiver 404 may, in operation, receive a transmission signal (for example an EHT basic PPDU used for non-trigger-based communications or an EHT TB PPDU used for trigger-based multi-AP joint transmission) comprising a signal field and a data field, the signal field comprising a RU allocation field and one or more user specific field and the data field comprising one or more PSDU. The circuitry 414 (for example the at least one receive signal processor 410 of the circuitry 414) may, in operation, process the received transmission signal, wherein a single PSDU of the one or more PSDU is transmitted over a RU combination, and whether two or more RUs of the RU combination share a LDPC tone mapper depends on the size of the two or more RUs of the RU combination.

Figure 4B:
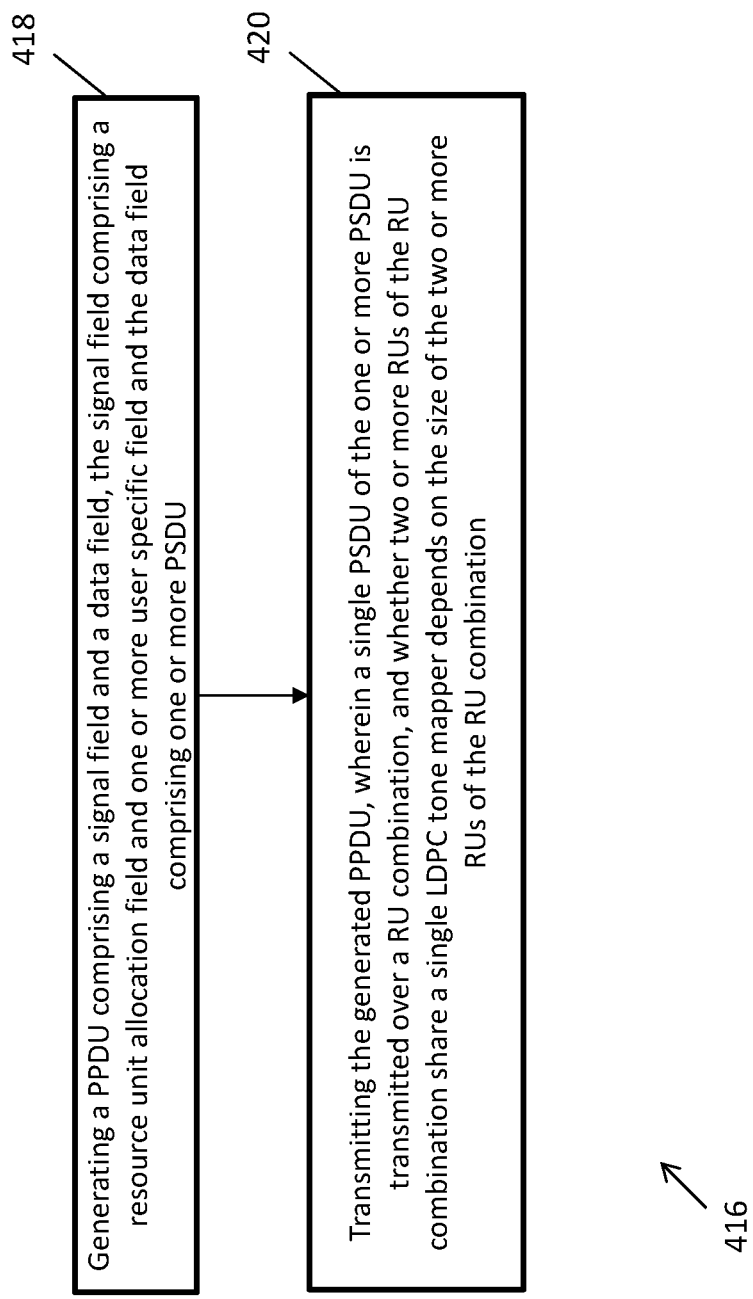
FIG. 4B shows a flow diagram illustrating a communication method according to the present disclosure.

FIG. 4B shows a flow diagram 416 illustrating a communication method for transmitting generated transmission signal according to the present disclosure. In step 418, a transmission signal is generated, the transmission signal (for example an EHT basic PPDU used for non-trigger-based communications or an EHT TB PPDU used for trigger-based communications) comprising a signal field and a data field, the signal field comprising a RU allocation field and one or more users specific field and the data field comprising one or more PSDU. In step 420, the generated transmission signal is transmitted to one or more other communication apparatuses, wherein a single PSDU of the one or more PSDU is transmitted over a RU combination, and whether two or more RUs of the RU combination share a single LDPC tone mapper depends on the size of the two or more RUs of the RU combination.

In various embodiments, wherein the two or more RUs of the RU combination share a single LDPC tone mapper if the size of the two or more RUs of the RU combination is not larger than a define value. In an embodiment, the define value is 996 tones. In various embodiments, same transmission parameters are applied to the two or more RUs of the RU combination that share a single LDPC tone mapper. In an embodiment, the same transmission parameters comprise MCS. According to various embodiments of the present disclosure, the two or more RUs of the RU combination that share a single LDPC tone mapper are indicated in the RU allocation field. In another embodiment, the one or more user specific field in the signal field includes user specific field corresponding to one of the two or more RUs of the RU combination that share a single LDPC tone mapper; and does not include user specific field corresponding to the remaining of the two or more RUs of the RU combination that share the single LDPC tone mapper. This may allow transmission over combinations of multiple RUs assigned to a single STA in an EHT PPDU and may advantageously enable efficient signaling support and improve spectral efficiency of 802.11be EHT WLAN over 802.11ax HE WLAN.

In the following paragraphs, certain exemplifying embodiments are explained with reference to an AP and multiple STAs for transmission over combinations of multiple RUs assigned to a single communication apparatus in an EHT basic PPDU or an EHT TB PPDU.

Figure 5:
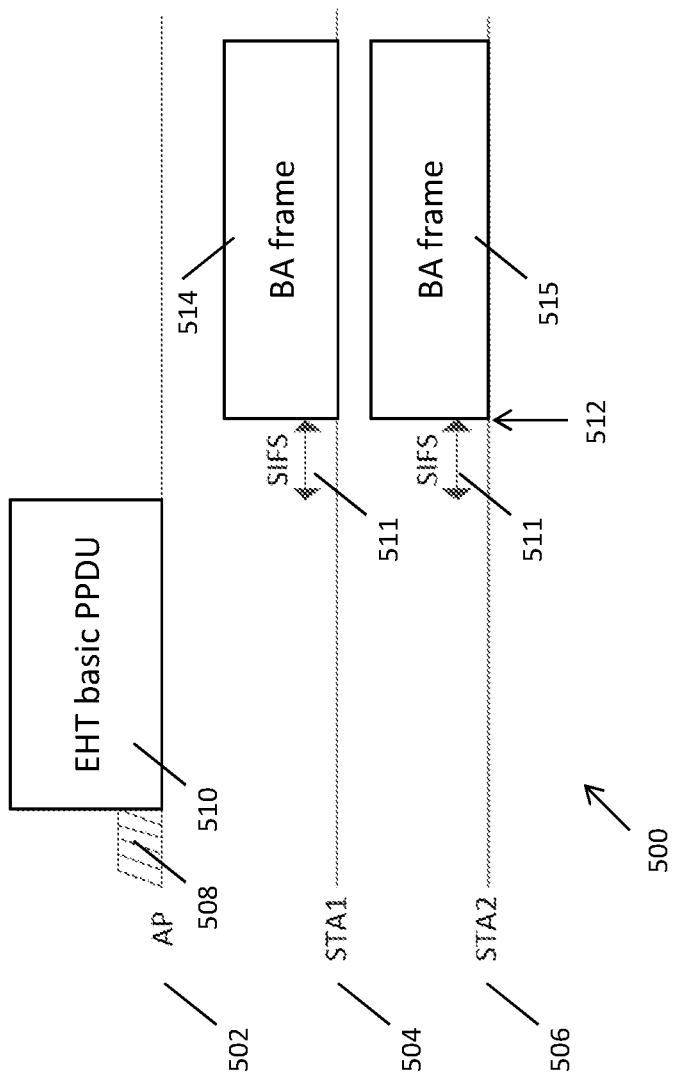
FIG. 5 depicts a flow chart illustrating a downlink communication according to various embodiments.

FIG. 5 depicts a flow chart 500 illustrating a downlink communication according to the present disclosure, where the downlink communication is between an AP 502 and a single STA 504 or between an AP 502 and multiple communication apparatuses like STAs 504, 506. Contention based channel access procedures, e.g. enhanced distributed channel access (EDCA) procedures, is illustrated by block 508, and short interframe spacing (SIFS) 411 is illustrated. The AP 502 may generate a transmission signal (for example an EHT basic PPDU) 510 comprising a signal field and a data field, the signal field comprising a RU allocation field and one or more user specific field and the data field comprising one or more PSDU. The ratio transmitter of AP 502 may transmit the generated transmission signal 510 to STA 504 or STAs 504, 506, wherein a single PSDU of the one or more PSDU is transmitted over a RU combination, and whether two or more RUs of the RU combination share a single LDPC tone mapper depends on the size of the two or more RUs of the RU combination.

In IEEE 802.11 networks, a SIFS is the time spacing prior to transmission of an acknowledgement by a STA. After the last symbol of the transmission signal 510 is transmitted, a SIFS 511 may take effect. At 512, when the transmission signal 510 is transmitted to STAs 504, 506 and contains one or more triggering frame for STAs 504, 506, STAs 504, 506 may generate respective transmission signals (for example EHT TB PPDUs) containing respective block acknowledgement (BA) frames 514, 515 and the radio transmitters of STAs 504, 506 may simultaneously transmit respective EHT TB PPDUs to AP 502 according to triggering information included in the transmission signal 510. At 512, when the transmission signal 510 is transmitted to STA 504 only, STA 504 may generate a transmission signal (for example EHT basic PPDU) containing a BA frame 514 and the radio transmitter of STA 504 may transmit the EHT basic PPDU containing the BA frame 514 to AP 502.

Figure 6A:
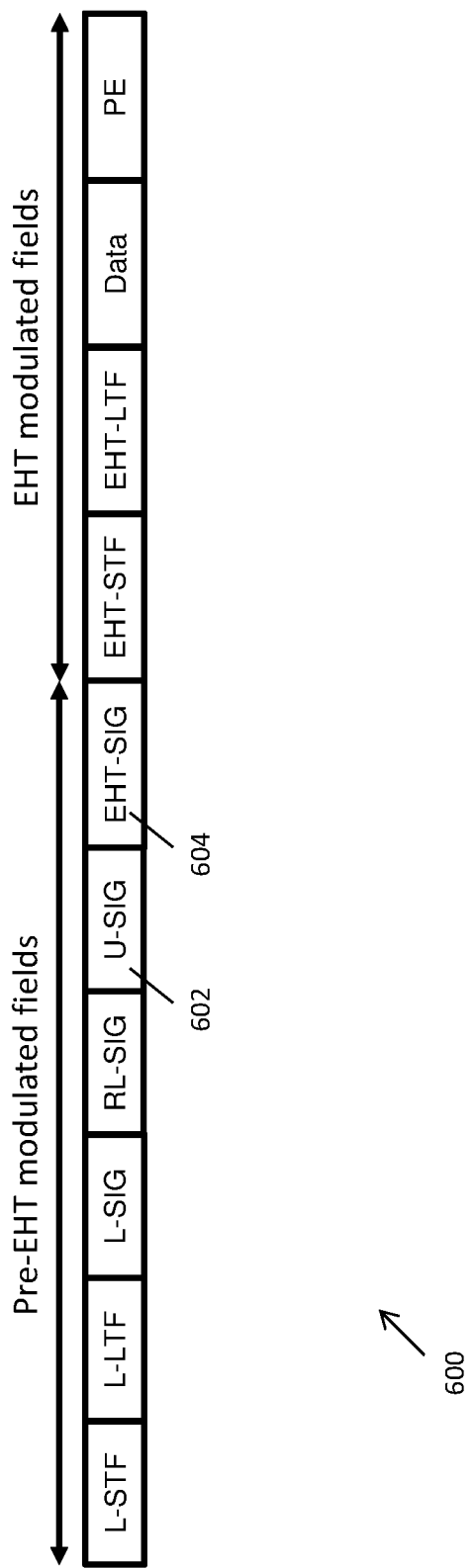
FIG. 6A depicts an example format of an EHT basic PPDU for non-trigger-based communications.

According to the present disclosure, an EHT basic PPDU can be used for non-trigger-based communications. FIG. 6A depicts an example format of an EHT basic PPDU 600. The EHT basic PDDU 600 comprises a L-STF, L-LTF, L-SIG field, RL-SIG field, a universal signal (U-SIG) field 602, an EHT signal (EHT-SIG) field 604, an EHT-STF, an EHT-LTF, a Data field and a PE field. The L-STF, the L-LTF, the L-SIG field, the RL-SIG field, the U-SIG field and the EHT-SIG field may be grouped as pre-EHT modulated fields, while the EHT-STF, the EHT-LTF, the Data field and the PE field may be grouped as EHT modulated fields. The RL-SIG field is used to identify any PHY (physical layer) versions starting with 802.11be.

Figure 6B:
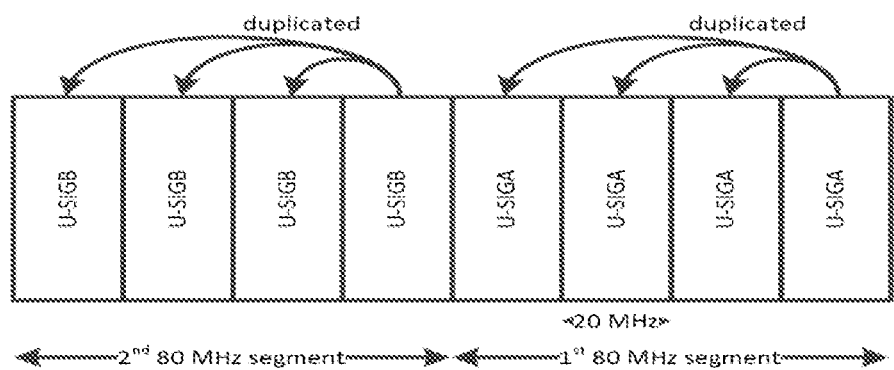
FIG. 6B depicts an example of transmission of U-SIG field.

According to various embodiments, U-SIG field 602 has a duration of two OFDM symbols. Data bits in the U-SIG field 602 are jointly encoded and modulated in the same manner as the HE-SIG-A field of 802.11ax. Modulated data bits in the U-SIG field 602 are mapped to 52 data tones of each of the two OFDM symbols and duplicated for each 20 MHz subchannel within each 80 MHz frequency segment. An example of transmission of U-SIG field 602, where the bandwidth of EHT basic PPDU 600 is 160 MHz, is illustrated in FIG. 6B. In this example, the U-SIG field transmitted in the $1^{st}$ 80 MHz frequency segment (i.e. U-SIGA) may contain different information from that transmitted in the $2^{nd}$ 80 MHz frequency segment (i.e. U-SIGB). According to various embodiments, the term "frequency segment" may be used interchangeably with the term "subchannel".

In various embodiments, U-SIG field 602 has a same format regardless of whether EHT basic PPDU 600 is transmitted to a single STA or multiple STAs. U-SIG field 602 comprises two parts: U-SIG1 and U-SIG2, each comprising 26 data bits. U-SIG field 602 comprises all version independent bits and a part of version dependent bits. All version independent bits are included in U-SIG1 and have static location and bit definition across different PHY versions, the version independent bits comprising PHY version identifier (3 bits), uplink/downlink (UL/DL) flag (1 bit), basic service set (BSS) color (e.g. 6 bits), transmission opportunity (TXOP) duration (e.g. 7 bits), and bandwidth (e.g. 3 bits). The PHY version identifier of the version independent bits is used to identify the exact PHY version starting with 802.11be. The effect of including all version independent bits into one part of U-SIG field 602, i.e. U-SIG1, is that the legacy STAs only require to parse U-SIG1 and thus their power efficiency can be improved. On the other hand, version dependent bits may have variable bit definition in each PHY version. The part of version dependent bits included in U-SIG field 602 may comprise PPDU type as well as EHT-SIG related bits which are used for interpreting EHT-SIG field 604, and punctured channel info related bits which are used for indicating whether each of 20 MHz subchannels within the 80 MHz frequency segment in which the U-SIG field 602 is transmitted is punctured.

TABLE 1

An example format of U-SIG field 602 of EHT basic PPDU 600.

| | Field name | Field size (bits) |
|---|---|---|
| U-SIG1 | PHY Version Identifier | 3 |
| | UL/DL Flag | 1 |
| | BSS Color | 6 |
| | TXOP Duration | 7 |
| | BW | 3 |
| | Reserved | 4 |
| | PPDU type | 2 |
| U-SIG2 | EHT-SIG Compression | 1 |
| | EHT-SIG DCM | 1 |
| | EHT-SIG EHT MCS | 3 |
| | Number Of EHT-SIG Symbols Or non-OFDMA Users | 5 |
| | Punctured Channel Info | 4 |
| | Reserved | 2 |
| | CRC | 4 |
| | Tail | 6 |
| | Total | 52 |

Table 1 illustrates an example format of U-SIG field 602. As mentioned above, the U-SIG field 602 comprises two parts: U-SIG1 and U-SIG2, each of the two parts containing 26 data bits. U-SIG1 comprises a PHY Version Identifier field, an UL/DL Flag field, a BSS Color field, a TXOP Duration field, a BW (bandwidth) field, and a PPDU Type field; whereas U-SIG2 comprises an EHT-SIG Compression field, an EHT-SIG Dual sub-Carrier Modulation (DCM) field, an EHT-SIG EHT MCS field, a Number Of EHT-SIG Symbols Or Non-OFDMA Users field, and a Punctured Channel Info field, followed by reserved bits, a Cyclic Redundancy Check (CRC) field for detecting error and tail bits. In an embodiment, when the PHY Version Identifier field refers to 802.11be, the PPDU Type field may be set to "0" for EHT basic PPDU and "1" for EHT TB PPDU. The Punctured Channel Info field may contain a bitmap indicating whether each of 20 MHz subchannels within the 80 MHz frequency segment in which the U-SIG field 602 is transmitted is punctured. The EHT-SIG Compression field may set to 1 to indicate non-OFDMA transmission and set to 0 to indicate OFDMA transmission. When EHT-SIG Compression field refer to non-OFDMA transmission, a value of "0" in the Number Of EHT-SIG Symbols Or Non-OFDMA Users field indicates a SU transmission and a nonzero value in the Number Of EHT-SIG Symbols Or Non-OFDMA Users field indicates a MU-MIMO transmission. Unless specified otherwise in this specification, it should be appreciable and apparent to one of ordinary skilled in the art that the standard definitions, protocols and functions of most of the fields in U-SIG field 602 listed in table 1 can be obtained from the IEEE P802.11ax/D6.0.

Returning to FIG. 6A, EHT-SIG field 604 of EHT basic PPDU 600 may include remaining version dependent bits. It has a variable MCS and variable length. EHT-SIG field 604 has a common field followed by one or user specific field which together are referred to as an EHT-SIG content channel. Each of the one or more user specific field carries user-specific resource allocation information. When the EHT basic PPDU 600 is transmitted to a single STA, there is a single user specific field in the EHT-SIG field 604. Otherwise there are more than one user specific fields in the EHT-SIG field 604. The common field comprises a first part and may comprise a second part. The first part comprises common information to all scheduled STA(s) except RU allocation information, whereas the second part may comprise the RU allocation information. The first part contains a determined number of data bits and may be the same across all EHT-SIG content channels; whereas the second part may be different among the EHT-SIG content channels.

Figures 6C, 6D:
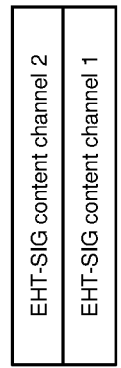
FIG. 6C shows a table of how the number of EHT-SIG content channels depends on the bandwidth of EHT basic PPDU.
FIG. 6D shows a diagram of mapping of two EHT-SIG content channels in a 40 MHz EHT basic PPDU.

FIG. 6C shows a table of how the number of EHT-SIG content channels depends on the bandwidth of EHT basic PPDU 600. As shown in FIG. 6C, in an embodiment where the BW of EHT basic PPDU 600 is 20 MHz, there will be only one EHT-SIG content channel. In an embodiment where the BW of EHT basic PPDU 600 is 40 MHz or 80 MHz, there will be two EHT-SIG content channels. In an embodiment where the BW of EHT basic PPDU 600 is 160 MHz or 80+80 MHz, there will be four EHT-SIG content channels. In an embodiment where the BW of EHT basic PPDU 600 is 240 MHz or 160+80 MHz, there will be six EHT-SIG content channels. In an embodiment where the BW of EHT basic PPDU 600 is 320 MHz or 160+160 MHz, there will be eight EHT-SIG content channels. More details will be provided below.

FIG. 6D shows a diagram of mapping of two EHT-SIG content channels in a 40 MHz EHT basic PPDU. A 40 MHz channel comprises two 20 MHz frequency segments. The two EHT-SIG content channels (namely, EHT-SIG content channel 1 and EHT-SIG content channel 2 are transmitted in the $1^{st}$ and $2^{nd}$ 20 MHz subchannels, respectively.

Figure 6E:
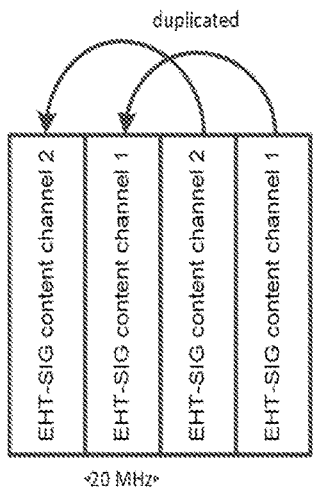
FIG. 6E shows a diagram of mapping of two EHT-SIG content channels in an 80 MHz EHT basic PPDU.

FIG. 6E shows a diagram of mapping of two EHT-SIG content channels (namely EHT-SIG content channel 1 and EHT-SIG content channel 2) in an 80 MHz EHT basic PPDU. In an 80 MHz channel comprising four 20 MHz subchannels, EHT-SIG content channel 1 is duplicated and transmitted in the $1^{st}$ and $3^{rd}$ 20 MHz subchannels while EHT-SIG content channel 2 is duplicated and transmitted in the $2^{nd}$ and $4^{th}$ 20 MHz subchannels.

Figure 6F:
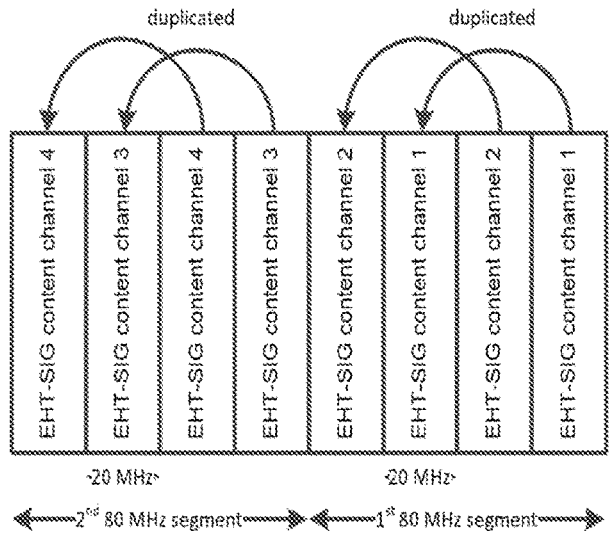
FIG. 6F shows a diagram of mapping of four EHT-SIG content channels in an 80+80 MHz or 160 MHz EHT basic PPDU.

FIG. 6F shows a diagram of mapping of four EHT-SIG content channels in an 80+80 MHz or 160 MHz EHT basic PPDU. In an 80+80 MHz or 160 MHz channel comprising eight 20 MHz subchannels, EHT-SIG content channel 1 is duplicated and transmitted in the $1^{st}$ and $3^{rd}$ 20 MHz subchannels with the $1^{st}$ 80 MHz frequency segment while EHT-SIG content channel 2 is duplicated and transmitted in the $2^{nd}$ and $4^{th}$ 20 MHz subchannels within the $1^{st}$ 80 MHz frequency segment. EHT-SIG content channel 3 is duplicated and transmitted in the $5^{th}$ and $7^{th}$ 20 MHz subchannels within the $2^{nd}$ 80 MHz frequency segment while EHT-SIG content channel 4 is duplicated and transmitted in the $6^{th}$ and $8^{th}$ 20 MHz subchannels within the $2^{nd}$ 80 MHz frequency segment.

TABLE 2

An example format of the first part of common field of EHT-SIG field 604

| Field name | Field size (bits) |
| --- | --- |
| LDPC Extra Symbol Segment | 1 |
| Pre-FEC Padding Factor | 2 |
| PE Disambiguity | 1 |
| Doppler | 1 |
| GI-LTF Size | 2 |
| Number Of EHT-LTF Symbols And Midamble Periodicity | 4 |
| Total | 11 |

Returning to EHT-SIG field 604, example format of the first part of common field of EHT-SIG field 604 is illustrated in table 2. As indicated above, the first part of common field comprises common information to all scheduled STA(s) except RU allocation information and contains a determined number of data bits which may be the same across all EHT-SIG content channels. Specifically, the first part of common field may comprise a LDPC Extra Symbol Segment subfield, a Pre-FEC Padding Factor subfield, a PE Disambiguity subfield, a Doppler subfield, a GI-LTF Size subfield and a Number Of EHT-LTF Symbols And Midamble Periodicity subfield.

The second part of common field of EHT-SIG field 604 may comprise RU allocation information and/or supplemental punctured channel information and may be different among the EHT-SIG content channels. It is noted that for non-OFDMA transmission, the RU allocation information may not be present in the common field of the EHT-SIG field 604. The RU allocation information and supplemental punctured channel information can be contained in a single field of the second part of the common field (e.g. RU Allocation Or Supplemental Punctured Channel Info field). Alternatively, RU allocation information and supplemental punctured channel information can be contained in two separate fields of the second part of the common field (e.g. RU Allocation Info field and Supplemental Punctured Channel Info field, respectively). Specifically, the second part of common field of EHT-SIG field 604 may comprise a bitmap to carry supplemental punctured channel information. The bitmap indicates whether each of 20 MHz subchannels outside the 80 MHz frequency segment in which the EHT-SIG field 604 is transmitted is punctured. As mentioned above, punctured channel information included in U-SIG field 602 may indicate whether each of 20 MHz subchannels within the 80 MHz frequency segment in which the U-SIG field 602 is transmitted is punctured. As a result, a STA only needs to process up to one 80 MHz frequency segment of the pre-EHT modulated fields (up-to and including EHT-SIG field) to get complete punctured channel information of EHT basic PPDU 600, which may result in reduced power consumption of the STA.

Example format of user specific field of EHT-SIG field 604 for non-MU MIMO allocation and MU-MIMO allocation are illustrated in tables 3 and 4 respectively. For non-MU MIMO allocation, a user specific field may comprise a STA ID field, an EHT MCS field, a DCM field, a Number Of Space-Time Streams (NSTS) field, a Coding field and a Beamformed field; whereas for MU-MIMO allocation, a user specific field may comprise a STA ID field, an EHT MCS field, a Spatial Configuration field and a Coding field. It should be appreciable and apparent to one of ordinary skilled in the art that the standard definitions, protocols and functions of all fields of common field and user specific field listed in tables 3 and 4 can be obtained from the IEEE P802.11ax/D6.0, unless specified otherwise in this specification.

TABLE 3

An example format of user specific field of EHT-SIG field 604 for non-MU-MIMO allocation

| Field name | Field size (bits) |
| --- | --- |
| STA ID | 11 |
| EHT MCS | 4 |
| DCM | 1 |

TABLE 3-continued

An example format of user specific field of
EHT-SIG field 604 for non-MU-MIMO allocation

| Field name | Field size (bits) |
|---|---|
| NSTS | 4 |
| Coding | 1 |
| Beamformed | 1 |
| Total | 22 |

TABLE 4

An example format of user specific field of
EHT-SIG field 604 for MU-MIMO allocation

| Field name | Field size (bits) |
|---|---|
| STA ID | 11 |
| EHT MCS | 4 |
| Spatial Configuration | 6 |
| Coding | 1 |
| Total | 22 |

TABLE 5

An example format of U-SIG field in EHT TB PPDU

| | Field name | Field size (bits) |
|---|---|---|
| U-SIG1 | PHY Version Identifier | 3 |
| | UL/DL Flag | 1 |
| | BSS Color | 6 |
| | TXOP Duration | 7 |
| | BW | 3 |
| | Reserved | 2 |
| | PPDU Type | 2 |
| | Reserved | 2 |
| U-SIG2 | Spatial Reuse 1 | 4 |
| | Spatial Reuse 2 | 4 |
| | Spatial Reuse 3 | 4 |
| | Spatial Reuse 4 | 4 |
| | CRC | 4 |
| | Tail | 6 |
| | Total | 52 |

According to the present disclosure, a STA only needs to process up to one 80 MHz frequency segment of the pre-EHT modulated fields (up-to and including EHT-SIG field) to get all the resource allocation information for itself. As a result, no 80 MHz frequency segment change is needed for a STA while processing the pre-EHT modulated fields, which may result in reduced power consumption of the STA.

Figure 7:
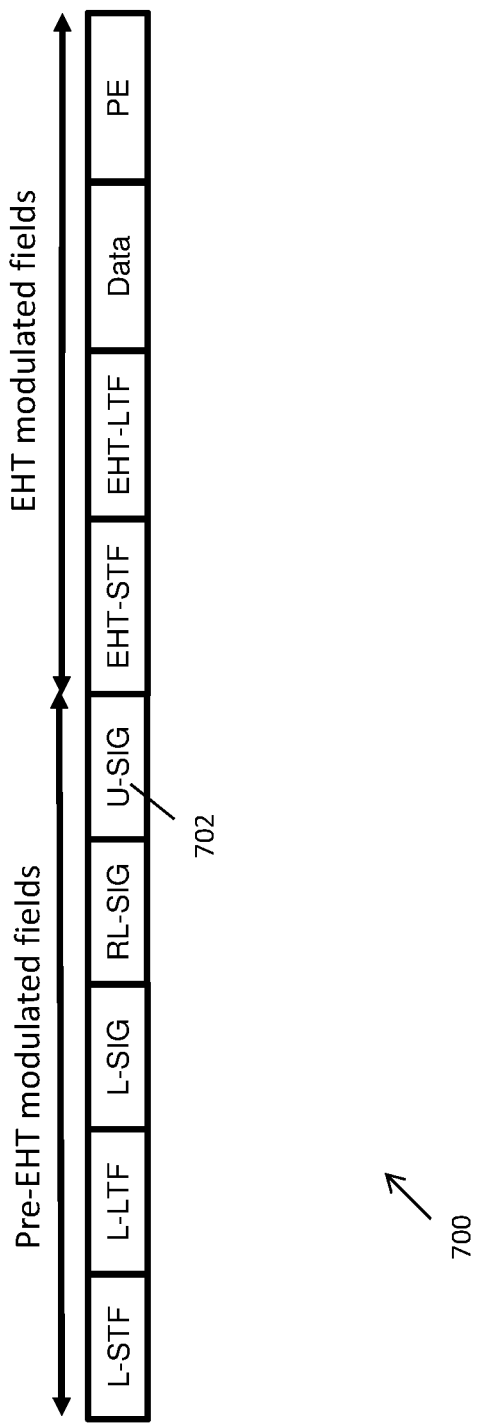
FIG. 7 depicts an example format of an EHT TB (trigger-based) PPDU.

FIG. 7 shows an example format of an EHT TB PPDU 700. The EHT TB PPDU 700 may include a L-STF, a L-LTF, a L-SIG field, a RL-SIG field, a U-SIG field 702, an EHT-STF, an EHT-LTF, a data field and a PE field. The EHT-STF of EHT TB PPDU 700 has a duration of 8 µs. The EHT TB PPDU 700 is used in an EHT WLAN for trigger-based transmission that is in response to a triggering frame. The information required for the trigger-based transmission is carried by the triggering frame that solicits this transmission. In a typical transmission of the EHT TB PPDU 700, U-SIG related information is copied from the previous triggering frame into the U-SIG field 702 of the EHT TB PPDU 700.

Table 5 depicts an example format of U-SIG field 702 of EHT TB PPDU 700. Similar to EHT basic PPDU 600, the U-SIG field 702 comprises two parts, U-SIG1 and U-SIG2, each comprising 26 data bits. In this embodiment, all version independent bits may be included in U-SIG1. The first part of U-SIG field 702, i.e. U-SIG1, comprises a PHY Version Identifier field, a UL/DL Flag field, a BSS Color field, a TXOP Duration field, a BW field and a PPDU Type field, which have same definitions as respective counterparts in U-SIG 602 of EHT Basic PPDU 600. The second part of U-SIG field 702, i.e. U-SIG2, comprises Spatial Reuse 1 to 4 fields, followed by a CRC field and tail bits. It should be appreciated and apparent to one of ordinary skilled in the art that that the standard definitions, protocols and functions of most of the fields in U-SIG field 702 of EHT TB PPDU 700 can be obtained from the IEEE P802.11ax/D6.0.

In various embodiments in the present disclosure, a component RU refers to a RU of two or more RUs of a RU combination. According to the present disclosure, when transmitting an EHT basic PPDU 600 or an EHT TB PPDU 700, a single PSDU may be transmitted over a RU combination, and whether two or more component RUs of the RU combination share a single LDPC tone mapper depends on the size of the two or more component RUs of the RU combination. In various embodiments, the two or more component RUs of a RU combination share a single LDPC tone mapper if the size of the two or more component RUs is not larger than a defined value (e.g. 242 tones or 996 tones). Otherwise, the two or more component RUs of the RU combination use different LDPC tone mappers. Further, in various embodiments, same transmission parameters (e.g. MCS, NSTS, etc.) are applied to two or more component RUs of a RU combination that share a single LDPC tone mapper. This is because for a RU combination, the frequency diversity gain across two or more component RUs that share a single LDPC tone mapper is exploited by LDPC tone mapping, applying different transmission parameters to the two or more component RUs of such RU combination may not be necessary. Advantageously, applying same transmission parameters to the two or more component RUs of such RU combination may reduce processing complexity of transmitter and receiver.

Additionally, for an EHT basic PPDU 600, user specific field corresponding to one of the two or more component RUs of the RU combination that share a single LDPC tone mapper exists in the EHT-SIG field 604; whereas user specific field(s) corresponding to the remaining of the two or more component RUs of the RU combination that share the single LDPC tone is skipped. Advantageously, this reduces the signalling overhead of EHT-SIG field 604. In an embodiment, component RUs of the RU combination that share a single LDPC tone mapper are explicitly indicated in RU allocation field of EHT-SIG field 604. In another embodiment, component RUs of the RU combination that use different LDPC tone mappers are either explicitly indicated in RU allocation field of EHT-SIG field 604 or implicitly indicated in user specific fields of EHT-SIG field 604. For example, user specific fields with same STA ID may implicitly indicate RUs of a RU combination, where each user specific field corresponds to a specific RU.

In the following paragraphs, two exemplifying embodiments with respect to two defined values are explained with reference to an AP and multiple STAs for transmission over combinations of multiple RUs assigned to a single communication apparatus in an EHT basic PPDU 600 or an EHT TB PPDU 700.

In a first embodiment of the present disclosure, the defined value is 242 tones, where two or more component RUs of a RU combination, which size is not larger than the defined value of 242 tones, share a single LDPC tone mapper. In the first embodiment, the number of LDPC tone mapper for a small-size RU combination is 1. It is noted that a small-size RU is defined to be RUs with less than 242 tones; and small-size RUs can only be combined with small-size RUs, as mentioned above. Same transmission parameters are applied to each component RU of a small-size RU combination. For an EHT basic PPDU 600, user specific field corresponding to a component RU (e.g. the first component RU) of two or more component RUs of the small-size RU combination exists in the EHT-SIG field 604; whereas user specific field(s) corresponding to the remaining of the two or more component RUs of the small-size RU combination is skipped. In an embodiment, each small-size RU combination is explicitly indicated in RU allocation field of EHT-SIG field 604.

Regarding LDPC tone mapping for a small-size RU combination, for an EHT basic PPDU 600 or an EHT TB PPDU 700 without DCM, the LDPC tone mapping for one or more LDPC encoded stream for a user in a small-size RU combination r is done by permuting the stream of constellation points (complex numbers) generated by the constellation mappers based on the following equation:

$$d''_{t(k),i,n,r,u} = d'_{k,i,n,r,u}, \quad \text{(Equation 1)}$$

where u is user index and u=0, 1, ..., $N_{user,r}-1$;

$N_{user,r}$ is the number of users multiplexed in the RU combination r, i is stream index and i=0, 1, ..., $N_{SS,r,u}-1$;

$N_{SS,r,u}$ is the number of spatial streams allocated to user u in the RU combination r;

n is OFDM symbol index and n=0, 1, ..., $N_{SYM}-1$;

$N_{SYM}$ is the number of OFDM symbols in the Data field of EHT Basic PPDU 600 or EHT TB PPDU 700;

k is data tone index and k=0, 1, 2, $N_{SD,r}-1$;

$N_{SD,r}$ is the total number of data tones in the RU combination r and $N_{SD,r} = N_{SD,r,1} + N_{SD,r,2}$;

$N_{SD,r,1}$ is the number of data tones in the first component RU of the RU combination r;

$N_{SD,r,2}$ is the number of data tones in the second component RU of the RU combination r;

$$t(k) = D_{TM,r}\left(k \bmod \frac{N_{SD,r}}{D_{TM,r}}\right) + \left[\frac{k \cdot D_{TM,r}}{N_{SD,r}}\right];$$

and $D_{TM,r}$ is LDPC tone mapping parameter for the RU combination r, which depends on the $N_{SD,r}$ value of the RU combination r.

Information regarding the above symbols and notations can be further referred to IEEE P802.11ax/D6.0.

On the other hand, according to the first embodiment, the number of LDPC tone mappers for a large-size RU combination is the number of component RUs of the large-size RU combination. In particular, there is one LDPC tone mapper for each of component RUs of a large-size RU combination. Different transmission parameters may be applied to component RUs of the large-size RU combination. For an EHT basic PPDU 600, user specific fields corresponding to all component RUs of the large-size RU combination exist in EHT-SIG field 604. In an embodiment, each large-size RU combination is explicitly indicted in RU allocation field of EHT-SIG field 604 or implicitly indicated in user specific fields of EHT-SIG field 604.

Regarding LDPC tone mapping for a large-size RU combination, LDPC tone mapping is done individually for each of component RUs of the large-size RU combination in a similar manner to 11ax LDPC tone mapping. It is noted that one LDPC tone mapper is used to perform LDPC tone mapping for a specific component RU; thus the number of LDPC tone mappers is equal to the number of component RUs of the large-size RU combination. In other words, the number of LDPC tone mappers corresponds to the number of LDPC tone mapping to be done for the RU combination.

In a second embodiment of the present disclosure, the defined value is 996 tones, where two or more component RUs, which size is not larger than the defined value of 996 tones, share a single LDPC tone mapper. In the second embodiment, the number of LDPC tone mapper for a RU combination with the size not larger than 996 tones is 1. Examples of RU combination with the size not larger than 996 tones include: (i) all small-size RU combinations; and (ii) any combination of one 242-tone RU and one 484-tone RU. Same transmission parameters are applied to each of component RUs of a RU combination with the size not larger than 996 tones. For an EHT basic PPDU 600, user specific field corresponding to a component RU (e.g. the first component RU) of two or more component RUs of such RU combination exists in EHT-SIG field 604; whereas user specific field(s) corresponding to the remaining of the two or more component RUs of such RU combination is skipped. In an embodiment, each RU combination with the size not larger than 996 tones is explicitly indicated in RU allocation field of EHT-SIG field 604.

Regarding LDPC tone mapping for a RU combination which size is not larger than 996 tones, for an EHT basic PPDU 600 or an EHT TB PPDU 700 without DCM, the LDPC tone mapping for the LDPC encoded stream for a user in such RU combination is done by permuting the stream of constellation points (complex numbers) generated by the constellation mappers based on the Equation 1 as illustrated above.

According to the second embodiment, the number of LDPC tone mappers for a large-size RU combination with a size larger than 996 tones and but not larger than 2*996 is 2. Examples of a large-size RU combination with size larger than 996 tones and but not larger than 2*996 tones include: (i) any combination of one 484-tone RU and one 996-tone RU; (ii) any combination of one 484-tone RU, one 242-tone RU and one 996-tone RU; and (iii) any combination of one 996-tone RU and one 996-tone RU. User specific field corresponding to one of two or more component RUs of such large-size RU combination that share a single LDPC is present in EHT-SIG field 604; whereas user specific field(s) corresponding to the remaining of the two or more component RUs of such large-size RU combination that share a single LDPC tone mapper is skipped.

For a large-size RU combination such as a combination of one 484-tone RU, one 242-tone RU and one 996-tone RU, where a single LDPC tone mapper is shared and used for both 484-tone RU and 242-tone RU and another LDPC tone mapper is used for 996-tone RU only, transmission parameters for both 484-tone RU and 242-tone RU are the same and may be different from those for 996-tone RU. User specific fields corresponding to 996-tone RU and one of both 484-tone RU and 242-tone RU are present in EHT-SIG filed 604 while user specific field corresponding to the remaining of 484-tone RU and 242-tone RU may be skipped. In an embodiment, a combination of one 484-tone RU, one 242-tone RU and one 996-tone RU is explicated indicated in RU allocation field of EHT-SIG field 604. Alternatively, a combination of one 484-tone RU, one 242-tone RU and one 996-tone RU is indicated in both RU allocation field and user specific fields of EHT-SIG field 604.

For a large-size RU combination such as a combination of two 996-tone RUs or a combination of 484-tone RU and 996-tone RU, transmission parameters for each of component RUs may be different. In an embodiment, a combination of one 484-tone RU and one 996-tone RU or a combination of two 996-tone RUs may be explicitly indicated in RU allocation field of EHT-SIG field 604 or implicit indicated in user specific fields.

On the other hand, according to the second embodiment, the number of LDPC tone mappers for a large-size RU combination with a size larger than 2*996 is the number of component RUs of the large-size RU combination. Examples of a large-size RU combination with a size larger than 2*996 tones include: (i) any combination of one 484-tone RU and two 996-tone RUs; (ii) any combination of three 996-tone RUs; and (iii) any combination of one 484-tone RU and three 996-tone RUs. There is one LDPC tone mapper for each of component RUs of such large-size RU combination. User specific fields corresponding to all component RUs of the large-size RU combination exist in EHT-SIG field 604. In an embodiment, each large-size RU combination is explicitly indicted in RU allocation field of EHT-SIG field 604 or implicitly indicated in user specific fields of EHT-SIG field 604.

Regarding LDPC tone mapping for a large-size RU combination such as a combination of one 484-tone RU and one 996-tone RU, a combination of two 996-tone RUs, a combination of one 484-tone RU and two 996-tone RUs, a combination of three 996-tone RUs or a combination of one 484-tone RU and three 996-tone RUs, LPDC tone mapping is done individually for each of component RUs of such large-size RU combination in a similar manner to 11ax LDPC tone mapping. It is noted that one LDPC tone mapper is used to perform LDPC tone mapping for a specific component RU; thus the number of LDPC tone mappers is equal to the number of component RUs of the large-size RU combination.

Regarding LDPC tone mapping for a combination of one 484-tone RU, one 242-tone RU and one 996-tone RU, for an EHT basic PPDU or an EHT TB PPDU without DCM, the LDPC tone mapping for the LDPC encoded stream for a user in both 484-tone RU and 242-tone RU of such RU combination is done by permuting the stream of constellation points (complex numbers) generated by the constellation mappers based on the Equation 1 as illustrated above. The LDPC tone mapping for the LDPC encoded stream for the user in the 996-tone RU of such RU combination is done in a similar manner to 11ax LDPC tone mapping.

Figure 8:
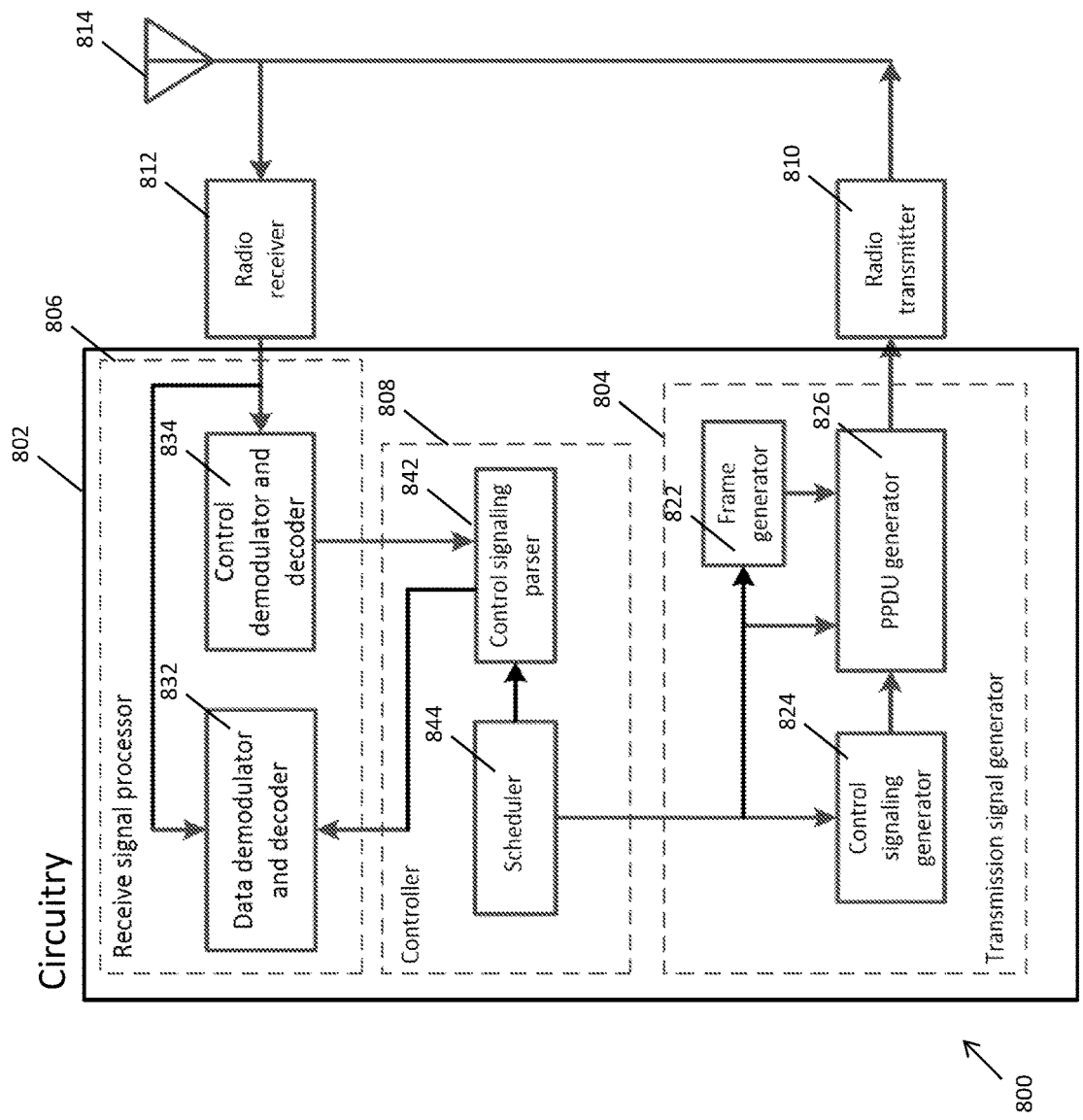
FIG. 8 shows a configuration of a communication device, for example an AP according to the present disclosure.

FIG. 8 shows a configuration of a communication device 800, for example an AP according to various embodiments. Similar to the schematic example of the communication apparatus 400 shown in FIG. 4A, the communication apparatus 800 includes circuitry 802, at least one radio transmitter 810, at least one radio receiver 812, at least one antenna 814 (for the sake of simplicity, only one antenna is depicted in FIG. 8). The circuitry 802 may include at least one controller 808 for use in software and hardware aided execution of tasks that the controller 808 is designed to perform transmissions over combinations of multiple RUs. The circuitry 802 may further include a transmission signal generator 804 and a receive signal processor 806. The at least one controller 808 may control the transmission signal generator 804 and the receive signal processor 806. The transmission signal generator 804 may include a frame generator 822, a control signaling generator 824, and a PPDU generator 826. The frame generator 822 may generate MAC frames, e.g. data frames or triggering frames. The control signaling generator 824 may generate control signaling fields of PPDUs to be generated (e.g. U-SIG fields and EHT-SIG fields of EHT basic PPDUs or U-SIG fields of EHT TB PPDUs). The PPDU generator 826 may generate PPDUs (e.g. EHT basic PPDUs or EHT TB PPDUs).

The receive signal processor 806 may include a data demodulator and decoder 834, which may demodulate and decode data portions of the received signals (e.g. data fields of EHT basic PPDUs or EHT TB PPDUs). The receive signal processor 806 may further include a control demodulator and decoder 834, which may demodulate and decode control signaling portions of the received signals (e.g. U-SIG fields and EHT-SIG fields of EHT basic PPDUs or U-SIG fields of EHT TB PPDUs). The at least one controller 808 may include a control signal parser 842 and a scheduler 844. The scheduler 844 may determine RU information and user-specific allocation information for allocations of non-trigger-based transmissions and triggering information for allocations of trigger-based transmissions. The control signal parser 842 may analyse the control signaling portions of the received signals and the triggering information for allocations of trigger-based transmissions shared by the scheduler 844 and assist the data demodulator and decoder 832 in demodulating and decoding the data portions of the received signals.

Figure 9:
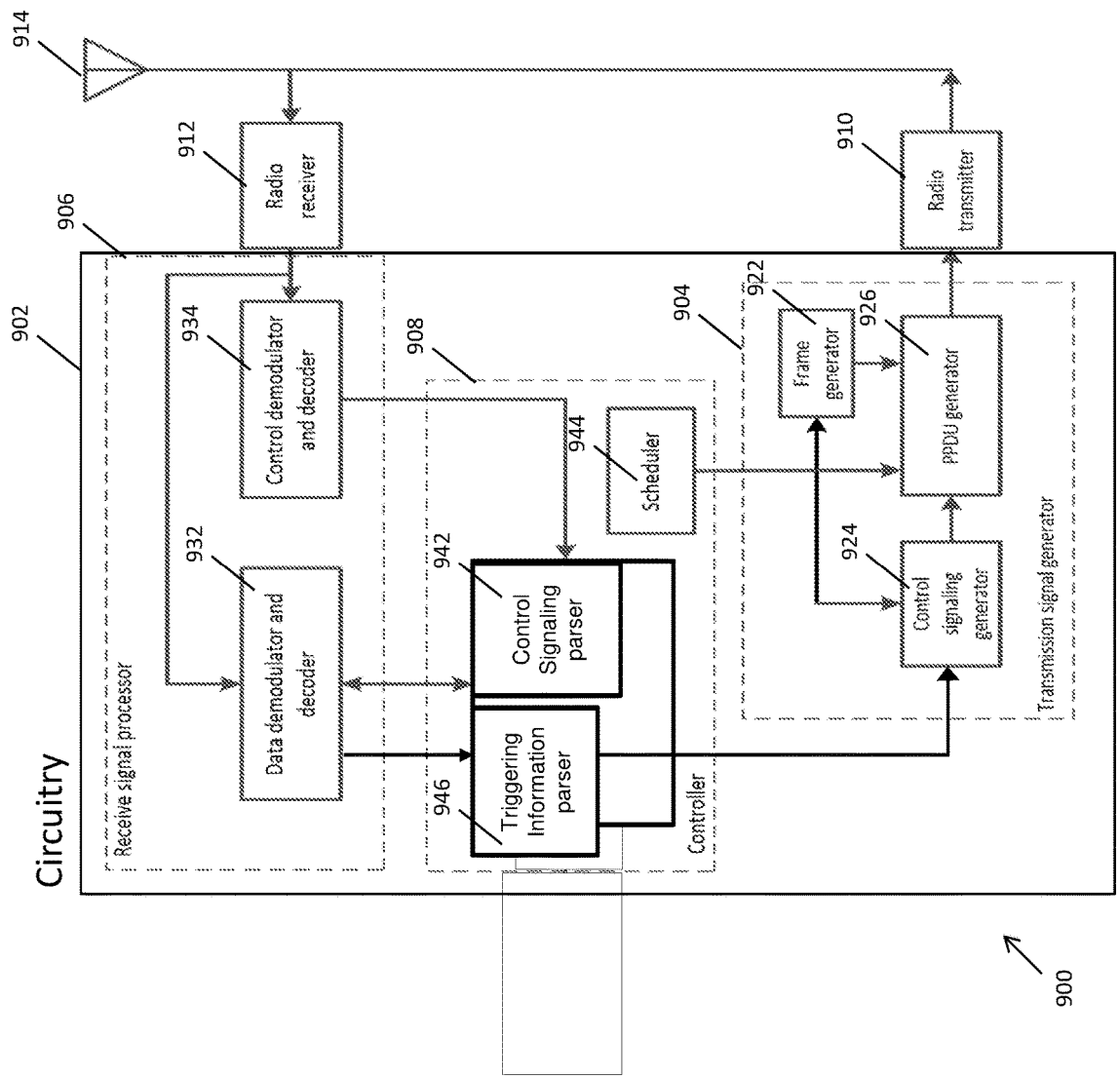
FIG. 9 shows a configuration of a communication device, for example an STA, according to the present disclosure.

FIG. 9 shows a configuration of a communication apparatus 900, for example a STA according to various embodiments. Similar to the schematic example of communication apparatus 400 shown in FIG. 4A, the communication apparatus 900 includes circuitry 902, at least one radio transmitter 910, at least one radio receiver 912, at least one antenna 914 (for the sake of simplicity, only one antenna is depicted in FIG. 9). The circuitry 902 may include at least one controller 908 for use in software and hardware aided execution of tasks that the controller 908 is designed to perform transmissions over combinations of multiple RUs. The circuitry 908 may further include a receive signal processor 904 and a transmission signal generator 906. The at least one controller 908 may control the receive signal processor 904 and the transmission signal generator 906. The receive signal processor 904 may include a data demodulator and decoder 932 and a control demodulator and decoder 934. The control demodulator and decoder 934 may demodulate and decode control signaling portions of the received signals (e.g. U-SIG fields and EHT-SIG fields of EHT basic PPDUs). The data demodulator and decoder 932 may demodulate and decode data portions of the received signals (e.g. data fields of ETH basic PPDUs) according to RU information and user-specific allocation information of its own allocations.

The at least one controller 908 may include a control signal parser 942, and a scheduler 944 and a trigger information parser 946. The control signal parser 942 may analyse the control signaling portions of the received signals (e.g. U-SIG fields and EHT-SIG fields of EHT basic PPDUs) and assist the data demodulator and decoder 932 in demodulating and decoding the data portions of the received signals (e.g. data fields of EHT basic PPDUs). The triggering information parser 948 may analyse the triggering information for its own uplink allocations from the received triggering frames contained in the data portions of the received signals. The transmission signal generator 904 may include a control signaling generator 924, which may generate control signaling fields of PPDUs to be generated (e.g. U-SIG fields and EHT-SIG fields of EHT basic PPDUs or U-SIG fields of EHT TB PPDUs). The transmission signal generator 904 may further include a PPDU generator 926, which generate PPDUs (e.g. EHT basic PPDUs or EHT TB PPDUs). The transmission signal generator 904 may further include a frame generator 922 may generate MAC frames, e.g. data frames.

As described above, the embodiments of the present disclosure provide an advanced communication system, communication methods and communication apparatuses for transmissions over combinations of multiple RUs in MIMO WLAN networks of an extremely high throughput and improve spectral efficiency in MIMO WLAN networks.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g. wearable camera, smart watch, tracking device), a game console, a digital book reader, a telehealth/telemedicine (remote health and medicine) device, and a vehicle providing communication functionality (e.g. automotive, airplane, ship), and various combinations thereof.

The communication apparatus is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

The invention claimed is:

1. A communication apparatus comprising:
   circuitry, which, in operation, generates a physical layer protocol data unit (PPDU) comprising a signal field and a data field, the signal field comprising a resource unit (RU) allocation field and one or more user specific field and the data field comprising one or more physical layer service data unit (PSDU); and
   a transmitter, which, in operation, transmits the generated PPDU, wherein a single PSDU of the one or more PSDU is transmitted over a RU combination, and whether two or more RUs of the RU combination share a single low density parity check (LDPC) tone mapper depends on a total size of the two or more RUs of the RU combination,
   wherein the two or more RUs of the RU combination are non-adjacent RUs of RUs arranged in a frequency domain.

2. The communication apparatus of claim 1, wherein the two or more RUs of the RU combination share a single LDPC tone mapper if the total size of the two or more RUs of the RU combination is not larger than a defined value.

3. The communication apparatus of claim 2, wherein the defined value is 996 tones.

4. The communication apparatus of claim 1, wherein same transmission parameters are applied to the two or more RUs of the RU combination that share a single LDPC tone mapper.

5. The communication apparatus of claim 4, wherein the same transmission parameters comprise modulation and coding scheme.

6. The communication apparatus of claim 1, wherein the two or more RUs of the RU combination that share a single LDPC tone mapper are indicated in the RU allocation field.

7. The communication apparatus of claim 1, wherein the one or more user specific field in the signal field includes user specific field corresponding to one of the two or more RUs of the RU combination that share a single LDPC tone mapper; wherein the one or more user specific field in the signal field does not include user specific field corresponding to the remaining of the two or more RUs of the RU combination that share the single LDPC tone mapper.

8. A communication method comprising:
generating a physical layer protocol data unit (PPDU) comprising a signal field and a data field, the signal field comprising a resource unit (RU) allocation field and one or more user specific field and the data field comprising one or more physical layer service data unit (PSDU); and
transmitting the generated PPDU, wherein a single PSDU of the one or more PSDU is transmitted over a RU combination, and whether two or more RUs of the RU combination share a single low density parity check (LDPC) tone mapper depends on a total size of the two or more RUs of the RU combination,
wherein the two or more RUs of the RU combination are non-adjacent RUs of RUs arranged in a frequency domain.

9. The communication method of claim 8, wherein the two or more RUs of the RU combination share a single LDPC tone mapper if the total size of the two of more RUs of the RU combination is not larger than a defined value.

10. The communication apparatus of claim 9, wherein the defined value is 996 tones.

11. The communication method of claim 8, further comprising applying same transmission parameters to the two or more RUs of the RU combination that share a single LDPC tone mapper.

12. The communication method of claim 11, wherein the same transmission parameters comprise modulation and coding scheme.

13. The communication method of claim 8, wherein the two or more RUs of the RU combination that share a single LDPC tone mapper are indicated in the RU allocation field.

14. The communication method of claim 8, wherein the one or more user specific field includes user specific field corresponding to one of the two or more RUs of the RU combination that share a single LDPC tone mapper; wherein the one or more user specific field does not include user specific field corresponding to the remaining of the two or more RUs of the RU combination that share the single LDPC tone mapper.

* * * * *